(12) United States Patent
Uchida et al.

(10) Patent No.: US 8,538,213 B2
(45) Date of Patent: Sep. 17, 2013

(54) SSC CHIP, FIBER ARRAY ATTACHED WITH SSC, PLC MODULE ATTACHED WITH SSC AND METHOD FOR MANUFACTURING SSC

(75) Inventors: Yasuyoshi Uchida, Tokyo (JP); Kazutaka Nara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 481 days.

(21) Appl. No.: 12/625,581

(22) Filed: Nov. 25, 2009

(65) Prior Publication Data

US 2010/0142900 A1    Jun. 10, 2010

(30) Foreign Application Priority Data

Nov. 26, 2008  (JP) .................................. 2008-301628

(51) Int. Cl.
*G02B 6/12* (2006.01)
*G02B 6/26* (2006.01)

(52) U.S. Cl.
USPC ..................... 385/43; 385/14; 385/49; 385/50

(58) Field of Classification Search
None
See application file for complete search history.

(56) References Cited

U.S. PATENT DOCUMENTS

| | | | |
|---|---|---|---|
| 5,142,596 A | | 8/1992 | Mizuuchi et al. |
| 5,439,782 A | | 8/1995 | Haemmerle et al. |
| 5,982,960 A | * | 11/1999 | Akiba et al. ..................... 385/24 |
| 6,775,454 B2 | | 8/2004 | Itoh et al. |
| 2002/0154863 A1 | * | 10/2002 | Mizuno et al. .................. 385/43 |
| 2002/0168166 A1 | * | 11/2002 | Itoh et al. ....................... 385/129 |
| 2004/0005118 A1 | * | 1/2004 | Lee et al. ......................... 385/43 |
| 2004/0114869 A1 | * | 6/2004 | Fike et al. ........................ 385/43 |

FOREIGN PATENT DOCUMENTS

| | | |
|---|---|---|
| JP | 04-356031 | 9/1992 |
| JP | 5-114762 A  * | 5/1993 |
| JP | 5-323139 A  * | 12/1993 |

(Continued)

OTHER PUBLICATIONS

Kei Watanabe et. al., Conference of Electronic Society of the Institute of Electronics, Information and Communication Engineers, C-3-7, PLC chip130 (2007).

(Continued)

*Primary Examiner* — Mike Stahl
(74) *Attorney, Agent, or Firm* — Turocy & Watson, LLP

(57) ABSTRACT

There is provided a SSC chip whose yield may be improved and whose processing steps may be simplified as compare to those of a prior art PLC chip having a light waveguide circuit to which a spot-size converter (SSC) is added, a fiber array attached with the SSC chip, a PLC module attached with the SSC chip and a method for manufacturing the SSC chip. The SSC chip has four spot-size converters and is fabricated separately from a PLC chip. Each SSC has a straight waveguide having the same core width and height with an end of an input/output waveguide of the PLC chip, a horizontally tapered waveguide in which the core width is enlarged in a tapered shape in the horizontal direction from the core width of the straight waveguide, a vertically tapered waveguide in which the core height is enlarged in a tapered shape in the vertical direction from the core height of the horizontally tapered waveguide and a spot-size enlarged portion whose core width and core height are both enlarged. Because it is unnecessary to fabricate the SSC at the end of the input/output waveguide of the PLC chip, a yield of the PLC chip may be improved.

16 Claims, 23 Drawing Sheets

(56) References Cited

FOREIGN PATENT DOCUMENTS

| JP | 07-027934 | | | 1/1995 |
|---|---|---|---|---|
| JP | 07-207470 | | | 8/1995 |
| JP | 09-197153 | | | 7/1997 |
| JP | 2000-206352 | A | * | 7/2000 |
| JP | 2002-156539 | | | 5/2002 |
| JP | 2003-035833 | | | 7/2003 |
| JP | 2007-34007 | A | * | 2/2007 |
| JP | 2007-93743 | A | * | 4/2007 |

OTHER PUBLICATIONS

Kei Watanabe, General Assembly of the Institute, c-3-81, PLC chip 251 (2005).

Mikitaka Ito et. al., Conference of Electronic Society of the Institute, c-3-13, PLC chip 146 (2003).

Mikitaka Ito et. al., General Assembly of the Institute, c-3-72, PLC chip 212 (2003).

Takayuki Mizuno et. al., General Assembly of the Institute, c-3-73, PLC chip 213 (2003).

N. Kitano, et al., "Spot Size Converter with Vertically Tapered Waveguide Core Fabricated by Sputter Etching". Japanese Journal of Applied Physics, vol. 47, No. 6, 2008, 3 pages.

H. Yoda, et al., "A Spot-Size Converter for Si-Wire Waveguides Utilizing Cascaded Up-Tapers". The Institute of Electronics, Information and Communication Engineers, 2007, University of California, Irvine, 3 pages.

K. Maru, et al., "Spot-size converter using vertical ridge taper for low fibre-coupling loss in 2.5%- silics waveguides". Electronics letters, vol. 42, No. 4, 2006, 2 pages.

JP OA dated May 11, 2012 for Japanese Application No. 2008-301628, 5 pages.

* cited by examiner

SSC CHIP, FIBER ARRAY ATTACHED WITH SSC, PLC MODULE ATTACHED WITH SSC AND METHOD FOR MANUFACTURING SSC

CROSS-REFERENCE TO RELATED APPLICATIONS

This application claims priority to Japanese Patent Application No. 2008-301628 filed in the Japanese Patent Office on Nov. 26, 2008, the entire content of which is incorporated herein by reference.

BACKGROUND OF THE INVENTION

1. Field of the Invention

The present invention relates to a SSC chip, a fiber array attached with the SSC chip, a PLC module attached with the SSC chip and a method for manufacturing the SSC chip.

2. Description of the Related Art

An increase of Δ (relative index difference) of a waveguide is been studied lately in order to integrate and miniaturize a planar lightwave circuit (PLC). However, a large coupling loss is generated in coupling a PLC chip having the planar lightwave circuit of the high Δ waveguide with a fiber array in which normal single mode fibers (SMF) are arrayed because a mode field of the high Δ waveguide is different from that of the single mode fiber. Still more, a large coupling loss is generated in coupling PLCs whose Δ of the waveguide is different because the mode field of the high A waveguide is different from the low Δ waveguide. Then, in order to reduce the mismatching of the mode fields, various spot-size converters (SSC) are being studied.

For example, as prior arts relating to the spot-size converter (SSC), there are technologies described in non-patent documents [1] Kei Watanabe et. al., Conference of Electronic Society of the Institute of Electronics, Information and Communication Engineers, C-3-7, PLC chip130 (2007), [2] Kei Watanabe, General Assembly of the Institute, c-3-81, PLC chip 251 (2005), [3] Mikitaka Ito et. al., Conference of Electronic Society of the Institute, c-3-13, PLC chip 146 (2003), [4] Mikitaka Ito et. al., General Assembly of the Institute, c-3-72, PLC chip 212 (2003) and [5] Takayuki Mizuno et. al., General Assembly of the Institute, c-3-73, PLC chip 213 (2003). Watanabe [1] describes a double-core type SSC in which a high Δ core having a tapered structure is disposed in a center of a low Δ core. Watanabe [2] describes a laminate SSC in which the high Δ core having the tapered structure is laminated on the low A core. Ito [3] describes a vertically and horizontally tapered SSC in which a core diameter is extended in vertical and horizontal directions. Ito [4] describes a SSC in which the core is formed into a shape of T by shortening an etching time of the vertically and horizontally tapered SSC. Mizuno [5] describes a narrowly tapered SSC in which a core diameter reduces in the horizontal direction.

Still more, as prior art technologies for creating a tapered core extending in the vertical direction, there are technologies described in Japanese Patent Application Laid-open Nos. Hei.09-197153, Hei. 07-027934 and 2002-156539. The JP Hei.09-197153 describes a technology of creating steps on a substrate or a cladding layer by means of etching and of creating a core extending in the vertical direction by that step. JP Hei. 07-027934 describes a technology of creating a tapered core by differentiating resists and core etching rates in photolithography. JP 2002-156539 describes a technology of creating a tapered core by creating steps on the core and by averaging the steps by depositing a core thin film on the steps.

By the way, the prior arts described above fabricate the PLC chip having the planar lightwave circuit so as to add the SSC at an end of the light waveguide to connect the light waveguide and fibers whose spot sizes are different at low loss. Due to that, this arrangement has had a problem that it adds a yield of the SSC to a yield of the light waveguide of the PLC chip itself, thus lowering a yield of the whole.

Still more, if the vertical and horizontal tapered core whose core diameter is enlarged in the vertical and horizontal directions is to be created in the PLC chip itself, a process of enlarging the core diameter in the vertical direction is required beside the process of enlarging the core in the horizontal direction by a photo-mask, so that there has been a problem that a manufacturing cost of the PLC chip itself increases by the increase of the processing steps.

SUMMARY OF THE INVENTION

Accordingly, noticing on the problems of the prior arts, the invention aims at providing a SSC chip whose yield may be improved and whose processing steps may be simplified as compare to those of the prior art PLC chip having the light waveguide circuit in which the spot-size converter (SSC) is added, a fiber array attached with the SSC chip, a PLC module attached with the SSC chip and a method for manufacturing the SSC chip.

In order to solve the aforementioned problems, according to a first aspect of the invention, there is provided a SSC chip used by being coupled with a PLC chip having a planar lightwave circuit and having one or a plurality of spot-size converters, the spot-size converter being a light waveguide composed of a clad and a core and having:

a straight waveguide whose core width and core height are constant;

a vertically tapered waveguide at least whose core height among the core width and core height is enlarged in a tapered shape in the vertical direction from the core height of the straight waveguide; and a spot-size enlarged portion whose core height and core width are both enlarged.

This arrangement permits to eliminate a necessity of fabrication of adding the SSC to the end of the light waveguide of the PLC chip, i.e., to the end of the input/output waveguide connected to a real circuit, to connect PLC chips having light waveguides whose spot sizes are different or to connect PLC chip with a fiber with low loss by fabricating the SSC chip having the spot-size converters (SSCs) independently from the PLC chip having the planar lightwave circuit. It improves a yield more than the conventional PLC chip having the planar lightwave circuit in which the SSC is added to the end of the input/output waveguide. Still more, it becomes unnecessary to create the vertical taper in which the core diameter is enlarged in the vertical direction in the PLC chip itself by fabricating the SSC chip independently from the PLC chip having the planar lightwave circuit and a process for enlarging the core diameter in the vertical direction becomes unnecessary in fabricating the PLC chip. Therefore, the PLC chip fabricating process may be simplified and a cost for manufacturing the PLC chip may be cut by the eliminated process.

According to a second aspect of the invention, the SSC chip is used for the PLC chip having no horizontally tapered waveguide whose core width is enlarged in a tapered shape in the horizontal direction is formed at the end of the input/output waveguide of the planar lightwave circuit and the spot-size converter has, in an order formed, a straight waveguide having the same core width and core height with the end of the input/output waveguide of the PLC chip;

a horizontally tapered waveguide whose core width is enlarged in a tapered shape in the horizontal direction from the core width of the straight waveguide;

a vertically tapered waveguide at least whose core height is enlarged in a tapered shape in the vertical direction from the core height of the straight waveguide; and a spot-size enlarged portion whose core height and core width are both enlarged.

According to this arrangement, the SSC chip has the horizontally tapered waveguide whose core width is enlarged in a tapered shape in the horizontal direction from the core width of the straight waveguide and the vertically tapered waveguide whose core height is enlarged in a tapered shape in the vertical direction from the core height of the straight waveguide. Therefore, this SSC chip may be used for the PLC chip having no horizontally tapered waveguide whose core width is enlarged in a tapered shape in the horizontal direction at each end of the plurality of input/output waveguides connected to the real circuit. Due to that, it becomes unnecessary to form the both horizontally and vertically tapered waveguides in the PLC chip, improving the yield further.

According to a third aspect of the invention, the SSC chip is used for the PLC chip having no horizontally tapered waveguide whose core width is enlarged in the tapered shape in the horizontal direction is formed at the end of the input/output waveguide of the planar lightwave circuit and the spot-size converter has, in an order formed, the straight waveguide having the same core width and core height with the end of the input/output waveguide of the PLC chip;

a vertically and horizontally tapered waveguide whose core width and core height are enlarged in a tapered shape in the vertical and horizontal directions from the core width and core height of the straight waveguide; and the spot-size enlarged portion whose core height and core width are both enlarged.

According to this arrangement, the SSC chip may be used for the PLC chip having no horizontally tapered waveguide whose core width is enlarged in the tapered shape in the horizontal direction at each end of the plurality of input/output waveguides connected to the real circuit. Due to that, it becomes unnecessary to form the both horizontally and vertically tapered waveguides in the PLC chip, improving the yield further.

According to a fourth aspect of the invention, the SSC chip is used for the PLC chip having no horizontally tapered waveguide whose core width is enlarged in the tapered shape in the horizontal direction is formed at the end of the input/output waveguide of the planar lightwave circuit and the spot-size converter has, in an order formed, the straight waveguide having the same core width and core height with the end of the input/output waveguide of the PLC chip;

the vertically tapered waveguide whose core height is enlarged in the tapered shape in the vertical direction from the core height of the straight waveguide;

the horizontally tapered waveguide whose core width is enlarged in the tapered shape in the horizontal direction from the core width of the straight waveguide; and the spot-size enlarged portion whose core height and core width are both enlarged.

According to this arrangement, the SSC chip may be used for the PLC chip having no horizontally tapered waveguide whose core width is enlarged in the tapered shape in the horizontal direction at each end of the plurality of input/output waveguides connected to the real circuit. Due to that, it becomes unnecessary to form the both horizontally and vertically tapered waveguides in the PLC chip, improving the yield further.

According to a fifth aspect of the invention, the SSC chip is used for the PLC chip in which the horizontally tapered waveguide whose core width is enlarged in the tapered shape in the horizontal direction is formed at the end of the input/output waveguide of the planar lightwave circuit and the spot-size converter has, in an order formed, the straight waveguide having the same core width and core height with the input/output waveguide of the PLC chip;

the vertically tapered waveguide whose core height is enlarged in the tapered shape in the vertical direction from the core height of the straight waveguide; and the spot-size enlarged portion whose core height and core width are both enlarged.

According to this arrangement, the SSC chip may be used for the PLC chip in which the horizontally tapered waveguide whose core width is enlarged in the tapered shape in the horizontal direction is formed at each end of the plurality of input/output waveguides connected to the real circuit. Due to that, it becomes unnecessary to form the vertically tapered waveguide in the PLC chip, improving the yield further.

According to a sixth aspect of the invention, a fiber array attached with the SSC chip has the SSC chip described in any one of the first through fifth aspects described above and a fiber array in which a plurality of fibers is arrayed and disposed, wherein the end face of the SSC chip is coupled with the end face of the fiber array so that each spot-size enlarged portion of the plurality of spot-size converters is coupled with each end face of the plurality of fibers respectively with minimum coupling loss.

According to this arrangement, it becomes possible to connect the light waveguide and the fiber of the PLC chips whose spot-sizes are different through the SSC chip with low loss by connecting the end of the straight light waveguide of each SSC of the SSC chip with the end of each input/output waveguide of the PLC chip so that the coupling loss is minimized in all ports. Still more, it is possible to improve a yield of the PLC chip using the fiber array attached with the SSC chip of the invention by fabricating the SSC chip having the plurality of spot-size converters independently from the PLC chip having the planar lightwave circuit.

According to a seventh aspect of the invention, a PLC module attached with the SSC chip has the SSC chip described in any one of the first through fifth aspects described above, the PLC chip having the planar lightwave circuit connected to the plurality of input/output waveguides and the fiber array in which the plurality of fibers is arrayed and disposed, wherein the end face of the SSC chip is coupled with the end face of the PLC chip so that each end face of the straight waveguides of the plurality of spot-size converters is coupled with each end face of the plurality of input/output waveguides of the planar lightwave circuit respectively with minimum coupling loss; and the other end face of the SSC chip is coupled with the end face of the fiber array so that each spot-size enlarged portion of the plurality of spot-size converters is coupled with each end face of the plurality of fibers respectively with minimum coupling loss.

According to this arrangement, the light waveguide of the PLC chip having the different spot sizes may be connected with each fiber of the fiber array through the SSC chip with low loss. Still more, it is possible to improve the yield more than the conventional PLC chip having the planar lightwave circuit in which the spot-size converter is added to the end of the input/output waveguide by fabricating the SSC chip having the plurality of spot-size converters independently from the PLC chip having the planar lightwave circuit.

According to an eighth aspect of the invention, there is provided a method for manufacturing the SSC chip described in any one of the first through fifth aspects described above, having steps of:

forming an under cladding layer on a substrate by means of flame hydrolysis deposition;

forming a first core layer on the substrate;

disposing a shadow mask having a plurality of openings at predetermined position on the first core layer to form a second core layer having a vertically tapered structure in which core height is enlarged in a tapered shape at the predetermined position on the first core layer by means of plasma chemical vapor deposition (CVD);

forming a plurality of waveguide patterns by means of photolithography and etching; and forming an upper cladding layer on the plurality of waveguide patterns by means of the flame hydrolysis deposition.

According to this arrangement, it is possible to create the vertically tapered waveguide in which the core diameter is enlarged in the vertical direction, i.e., the core height is enlarged in the tapered shape in the vertical direction, by carrying out the step of forming the second core layer of the SSC chip by combining the plasma CVD with the shadow mask. Due to that, it is possible to cut a processing step of enlarging the core diameter in the vertical direction in fabricating the PLC chip, thus simplifying the process. Accordingly, it is possible to improve the yield and to simplify the process as compared to the process for fabricating the conventional PLC chip having the light waveguide to which the spot-size converter (SSC) is added.

According to a ninth aspect of the invention, in the method for manufacturing the SSC chip, the first core layer is formed by means of plasma CVD. According to this arrangement, the first core layer is formed by the plasma CVD and the second core layer having the vertically tapered structure is formed on the first core layer by the plasma CVD in the same manner. Thereby, the first core layer has the same optical characteristics with the second core layer, so that the SSC chip excellent in the optical characteristics may be realized.

According to a tenth aspect of the invention, in the method for manufacturing the SSC chip, the first core layer is formed by means of flame hydrolysis deposition.

As described above, the invention permits to improve the yield of the PLC chip more than the conventional PLC chip having the light waveguide circuit to which the SSC is added by fabricating the SSC chip having the spot-size converters independently from the PLC chip having the planar lightwave circuit.

Still more, it is possible to create the vertically tapered waveguide in which the core diameter is enlarged in the vertical direction, i.e., the core height is enlarged in the tapered shape in the vertical direction, by carrying out the step of forming the second core layer of the SSC chip by combining the plasma CVD with the shadow mask. Due to that, it is possible to cut the processing step of enlarging the core diameter in the vertical direction in fabricating the PLC chip, thus simplifying the process. Accordingly, it is possible to improve the yield and to simplify the process as compared to the process for fabricating the conventional PLC chip having the light waveguide to which the spot-size converter (SSC) is added.

The above and other advantages of the invention will become more apparent in the following description and the accompanying drawings in which like numerals refer to like parts.

BRIEF DESCRIPTION OF THE DRAWINGS

FIGS. 5A, 5B and 5C respectively show the spot-size converter, wherein FIG. 5A is a plan view thereof, FIG. 5B is a longitudinal section view thereof and FIG. 5C is a section view showing cross sections of respective parts thereof;

FIGS. 11A, 11B and 11C respectively show a spot-size converter of a SSC chip of a second embodiment of the invention, wherein FIG. 11A is a plan view thereof, FIG. 11B is a longitudinal section view thereof and FIG. 11C is a section view showing cross sections of respective parts thereof;

FIGS. 12A, 12B and 12C respectively show a spot-size converter of a SSC chip of a third embodiment of the invention, wherein FIG. 11A is a plan view thereof, FIG. 11B is a longitudinal section view thereof and FIG. 11C is a section view showing cross sections of respective parts thereof;

FIGS. 13A, 13B and 13C respectively show a spot-size converter of a SSC chip of a fourth embodiment of the invention, wherein FIG. 11A is a plan view thereof, FIG. 11B is a longitudinal section view thereof and FIG. 11C is a section view showing cross sections of respective parts thereof;

DESCRIPTION OF THE PREFERRED EMBODIMENTS

Preferred embodiments of a SSC chip having a spot-size converter (SSC) embodying the present invention, a fiber array attached with the SSC chip, a PLC module attached with the SSC chip and a method for manufacturing the SSC chip will now be explained with reference to the drawings.

(First Embodiment of SSC Chip)

Firstly, the SSC chip 10 of the first embodiment of the invention will be explained with reference to FIGS. 1 through 5.

Figure 1:
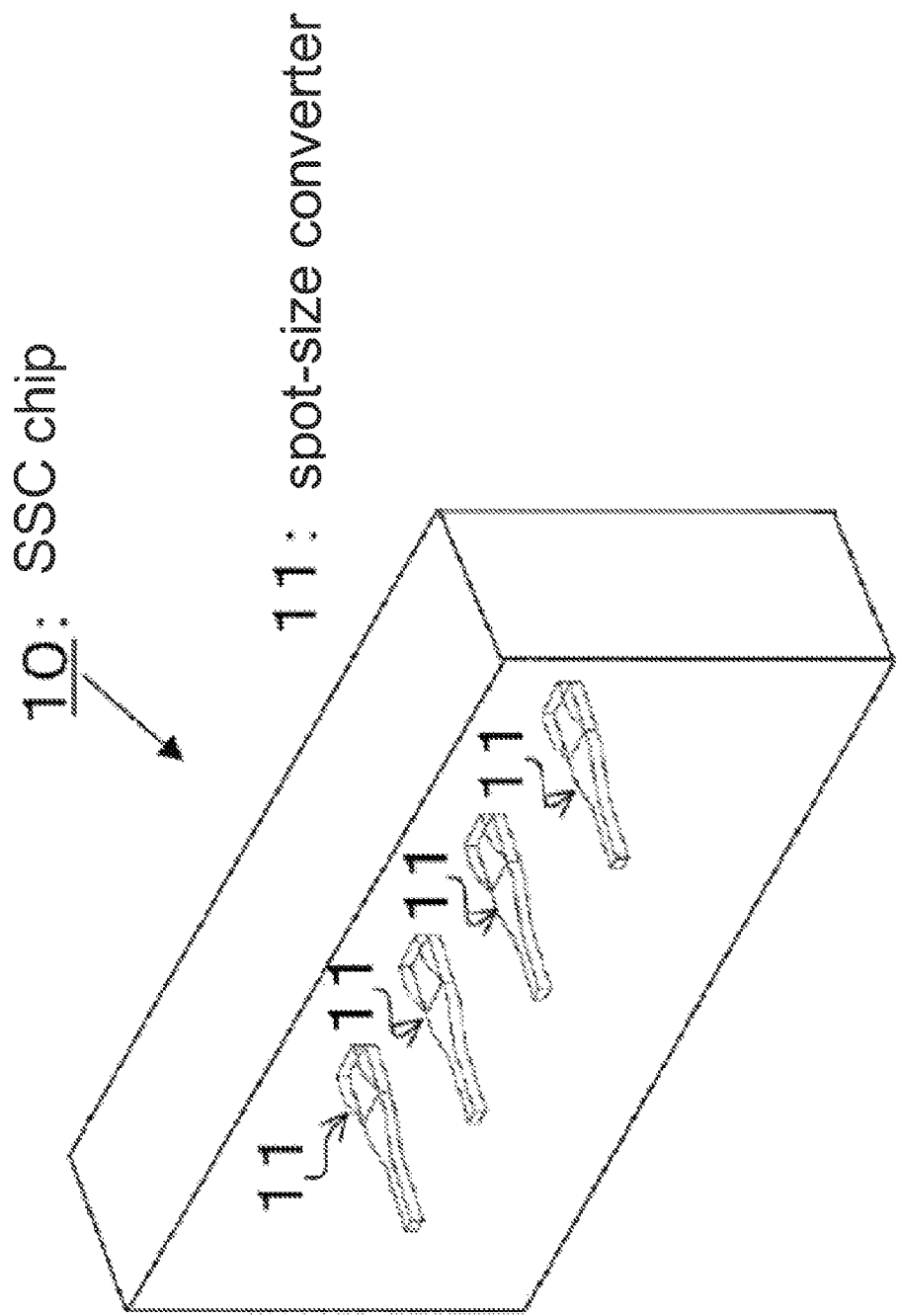
FIG. 1 is a perspective view showing a SSC chip according to an embodiment of the present invention.
Figure 2:
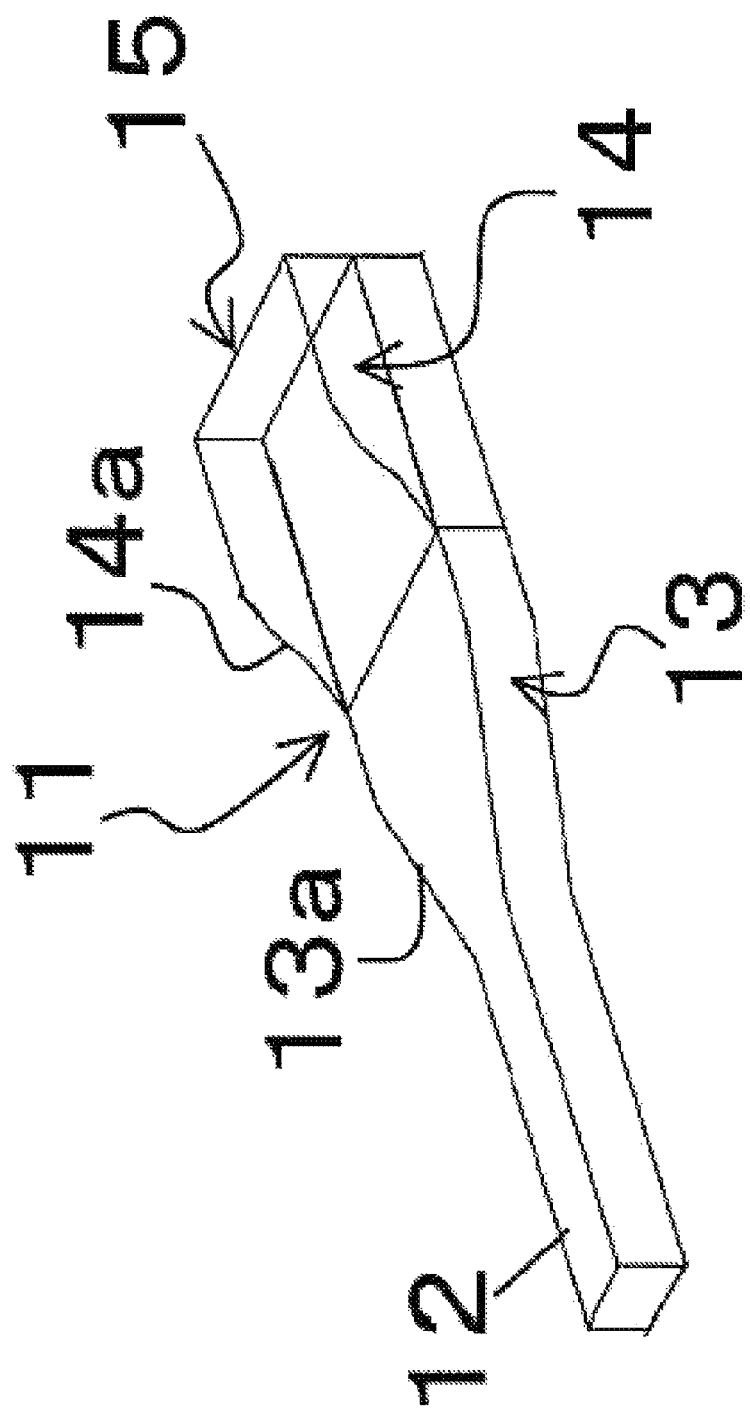
FIG. 2 is an enlarged view of one spot-size converter of the SSC chip.
Figure 3:
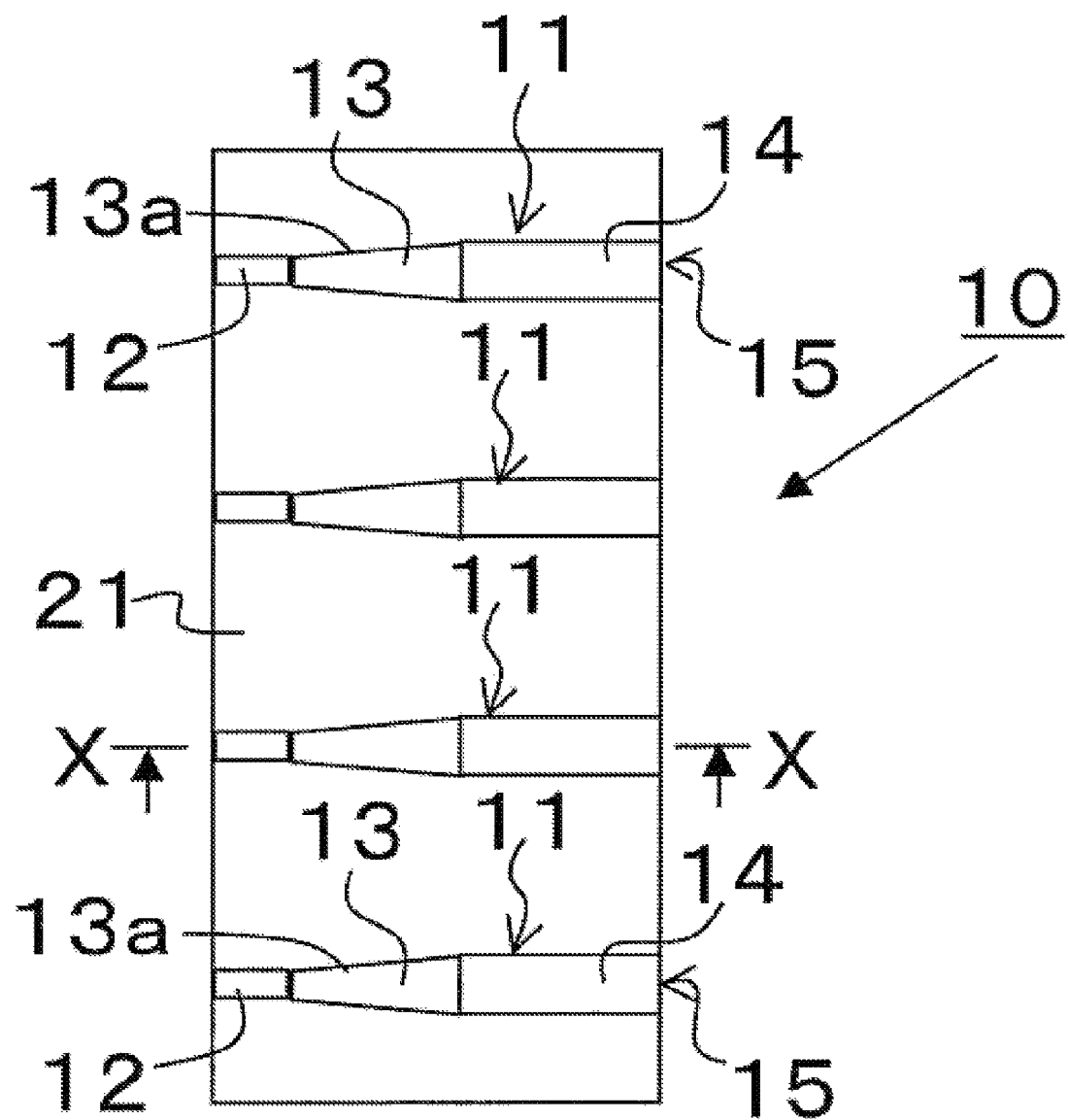
FIG. 3 is a plan view showing the SSC chip.
Figure 4:
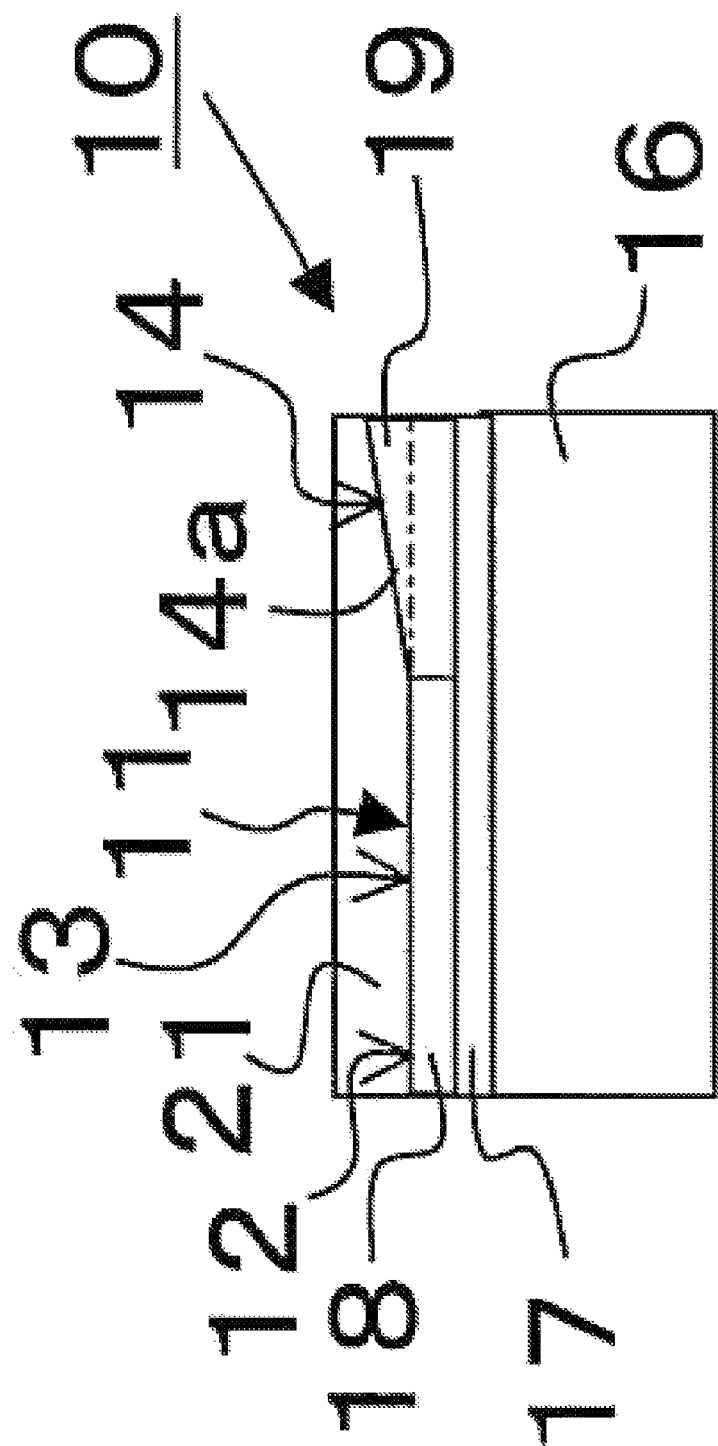
FIG. 4 is a section view along a line X-X in FIG. 3.
Figure 5:
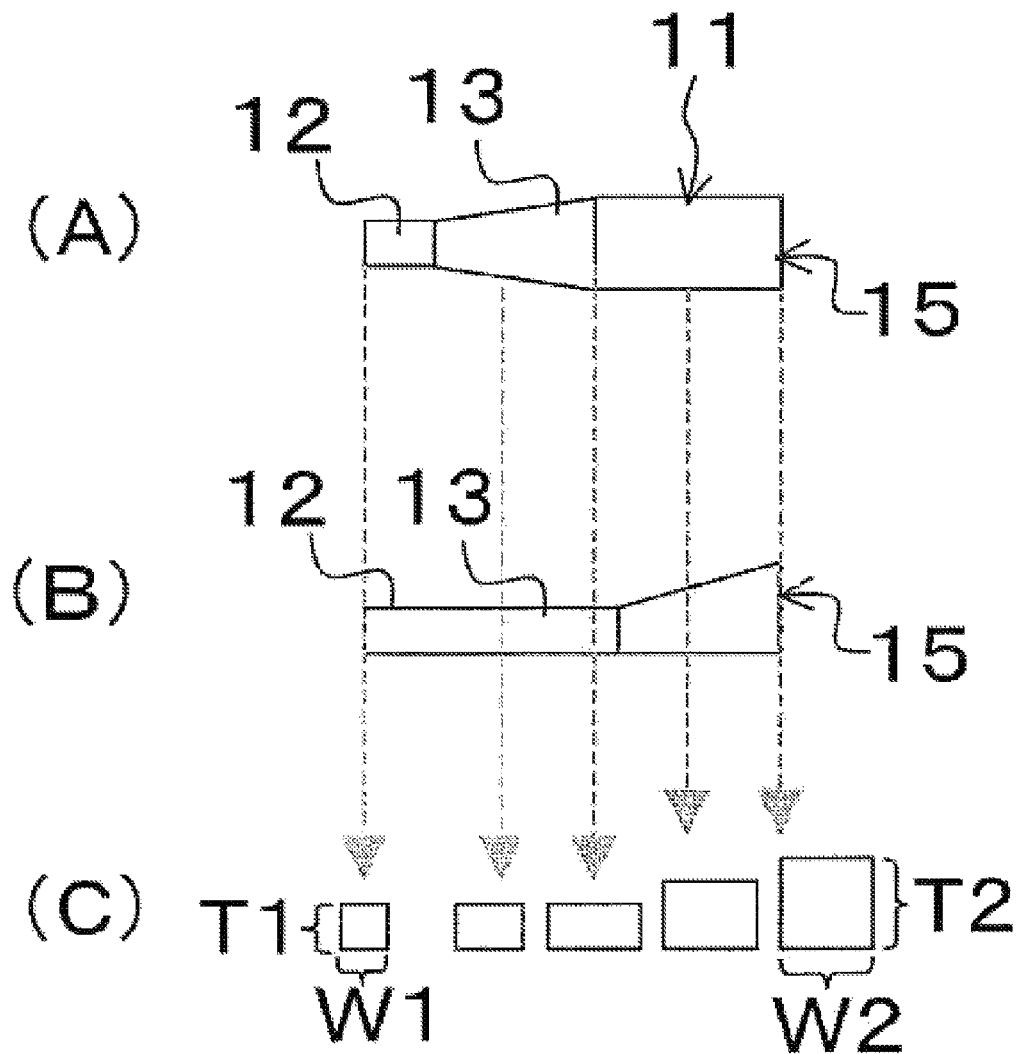

FIG. 1 is a perspective view showing the SSC chip 10, FIG. 2 is an enlarged view of one spot-size converter of the SSC chip 10, FIG. 3 is a plan view showing the SSC chip 10, FIG. 4 is a section view along a line X-X in FIG. 3 and FIGS. 5A, 5B and 5C respectively show the spot-size converter 11, wherein FIG. 5A is a plan view thereof, FIG. 5B is a longitudinal section view thereof and FIG. 5C is a section view showing cross sections of respective parts thereof.

It is noted that in FIGS. 1 through 5, the same parts are denoted by the same reference numerals even though their shapes and rates of their sizes are more or less different. Still more, the SSC chip explained in the following respective embodiments is what is used while being connected with a PLC chip having a planar lightwave circuit (PLC) and has one or a plurality of spot-size converters (SSC). The PLC chip is provided with an arrayed waveguide grating (AWG), a real circuit such as a Mach-Zehnder interferometer and the planar lightwave circuit containing a light waveguide made of a core and a clad each composing a plurality of input/output waveguides connected to the real circuit.

The SSC chip 10 of the first embodiment has four spot-size converters (referred to as SSCs hereinafter) 11 for example as shown in FIGS. 1 and 2 and is fabricated separately from the PLC chip described above.

Figure 15:
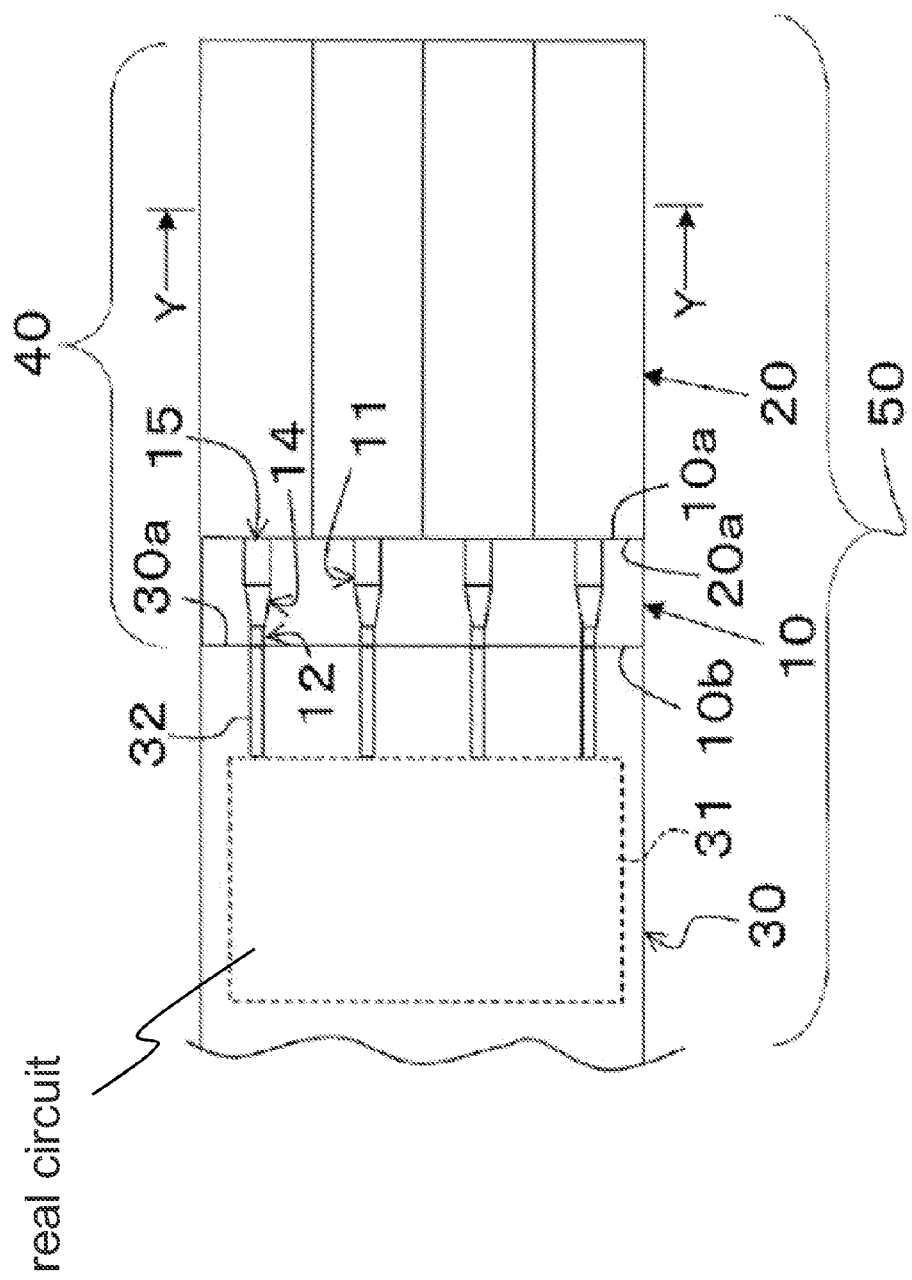
FIG. 15 is a plan view showing the fiber array attached with the SSC chip.

The SSC chip 10 is used for the PLC chip 30 as shown in FIG. 15. This PLC chip 30 is what has no horizontal tapered waveguide whose core width is enlarged in a tapered shape in the horizontal direction at each end of a plurality of input/output waveguides 32 connected to the real circuit 31 (this PLC chip will be referred to as a "pp of type A" hereinafter).

As shown in FIGS. 2 through 5, each of the four SSCs 11 is provided with a straight waveguide 12 having the same core width and core height with the end of the input/output waveguide 32 of the PLC chip 30, a horizontally tapered waveguide 13 whose core width is enlarged in a tapered shape in the horizontal direction from the core width of the straight waveguide 12, a vertically tapered waveguide 14 whose core height is enlarged in a tapered shape in the vertical direction from the core height of the horizontally tapered waveguide 13 and a spot-size enlarged portion 15 whose core width and core height are both enlarged, respectively formed in this order. The spot-size enlarged portion 15 is an end of the vertically tapered waveguide 14.

As shown in FIGS. 3 and 4, the SSC chip 10 shown in FIG. 1 has a substrate 16, a lower cladding layer 17 formed on the substrate 16, a first core layer 18 formed on the lower cladding layer 17, a second core layer 19 formed on part of the first core layer 18 and an upper cladding layer 21 formed on the first core layer 18 and the second core layer 19 so as to bury the whole of the first core layer 18 and the second core layer 19. The straight waveguide 12 and the horizontally tapered waveguide 13 are formed by the lower cladding layer 17, the first core layer 18 and the upper cladding layer 21 and the vertically tapered waveguide 14 is formed by the lower cladding layer 17, the first core layer 18, the second core layer 19 and the upper cladding layer 21.

As shown in FIGS. 5A through 5C, the SSC 11 of the SSC chip 10 constructed as described above has a structure in which the core height and core width of one end, i.e., the core height T2 and core width W2 of the spot-size enlarged portion 15 are enlarged as compared to the core height and core width of the other side, i.e., the core height T1 and core width W1 of the straight waveguide 12.

(One Exemplary Method for Manufacturing the SSC Chip)

The SSC chip 10 of the first embodiment described above is fabricated as follows:

(First Stage)

Figure 6A:
FIGS. 6A, 6B and 6C are explanatory diagrams showing one exemplary process of a method for manufacturing the SSC chip.

At first, the lower cladding layer 17 is formed on the substrate 16 by means of flame hydrolysis deposition (FHD) as shown in FIG. 6A.

In the first stage, a silica material (glass particles of $SiO_2$) that is to become the lower cladding layer 17 is deposited on the substrate 16 such as a silicon substrate and is heated to melt and to make transparent the glass film by means of the flame hydrolysis deposition for example.

(Second Stage)

Next, the first core layer 18 made of a silica material (glass particles of $SiO_2$) is formed on the lower cladding layer 17 by means of plasma CVD within a plasma CVD apparatus not shown (see FIG. 6A).

(Third Stage)

Figure 6B:
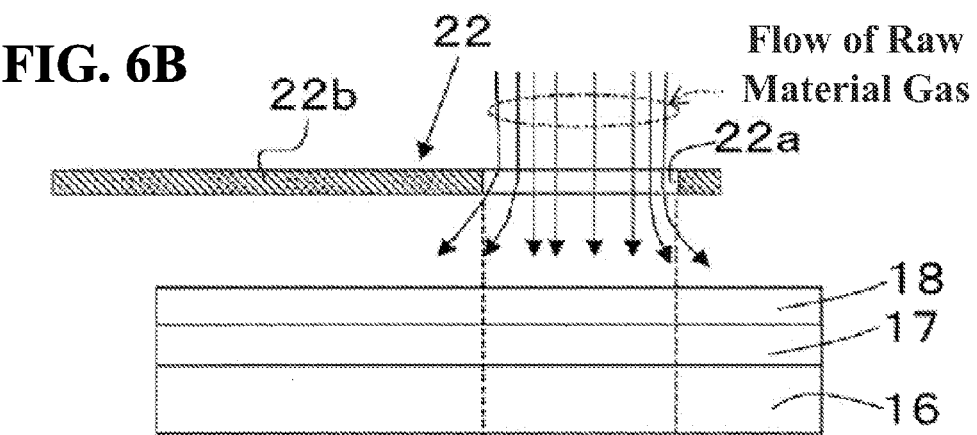
Figure 6C:
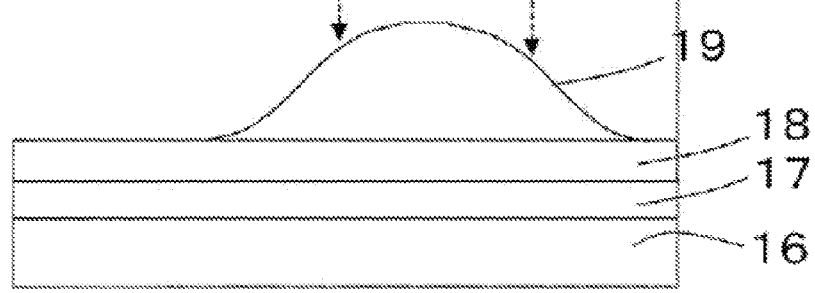
Figure 7A:
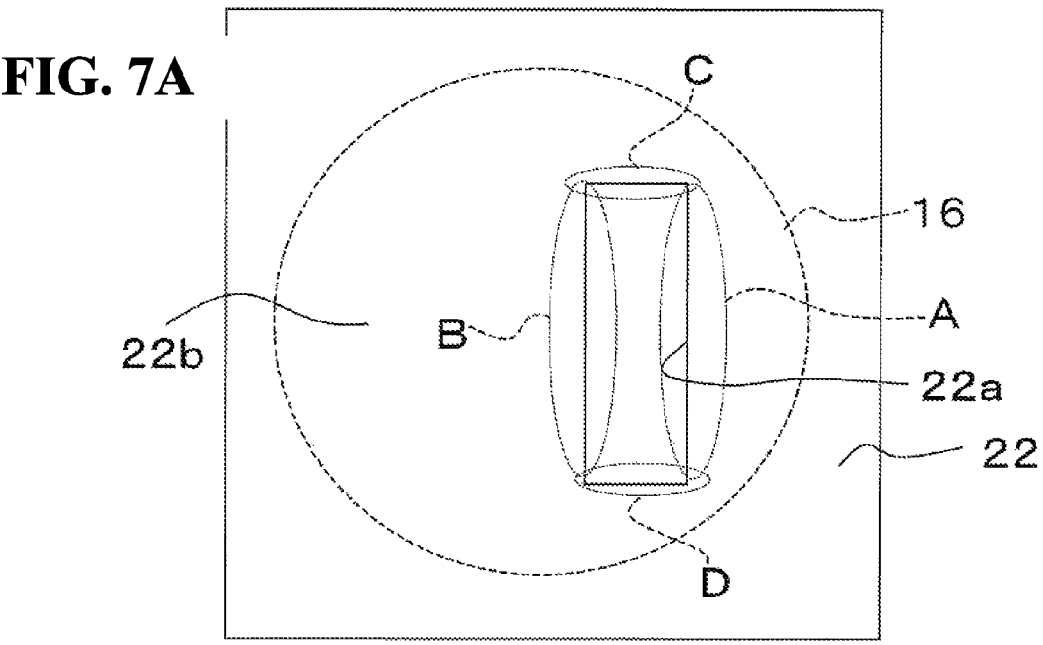
FIGS. 7A, 7B and 7C are explanatory diagrams showing one exemplary process of a method for manufacturing the SSC chip.
Figure 7B:
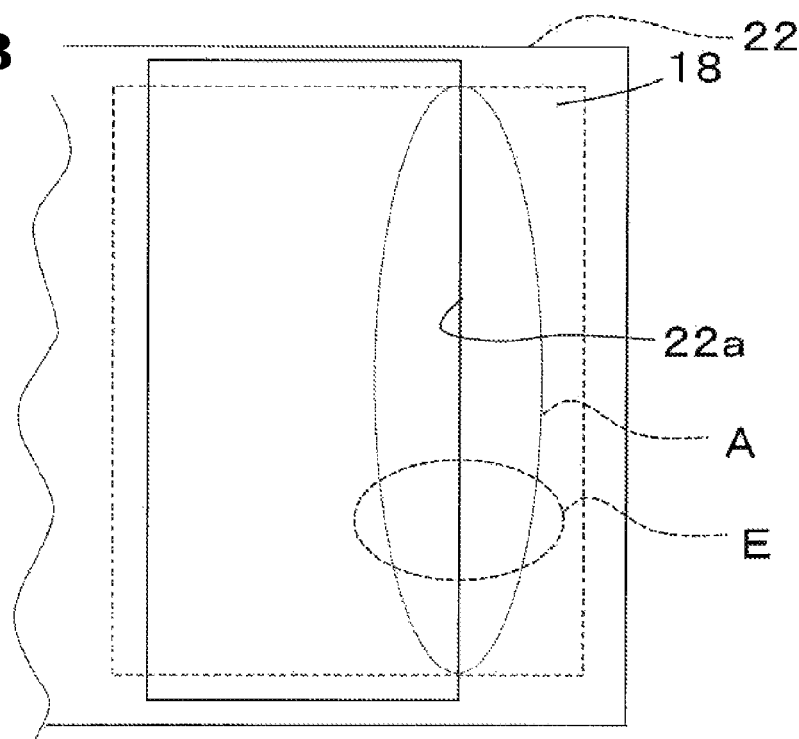
Figure 7C:
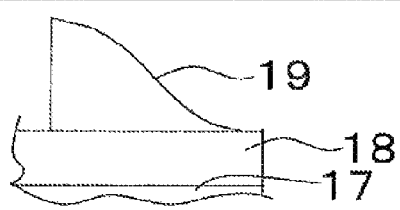

Next, a shadow mask 22 having a rectangular opening 22a as shown in FIGS. 7A and 7B is disposed at predetermined position on the first core layer 18 within the plasma CVD apparatus (see FIG. 6B, 7A and 7B) to form the second core layer 19 made of the silica material (glass particles of $SiO_2$) and having the structure tapered in the vertical direction, i.e., the core height is enlarged in the tapered shape in the vertical direction, is formed at the predetermined position on the first core layer 18 by means of the plasma CVD (see FIG. 6C and 7C).

In this third stage, raw material gas in a plasma state (activated radicals and ions) turns around under the shadow mask 22 at each of boundaries A, B, C and D (see FIGS. 7A and 7B) of a shadow mask 22 and the opening 22a of the shadow mask 22, so that the second core layer 19 having the structure tapered in the vertical direction, i.e., the core height is enlarged in the tapered shape in the vertical direction, is formed at the predetermined position on the first core layer 18 as shown in FIGS. 6C and 7C.

(Fourth Stage)

Figure 8A:
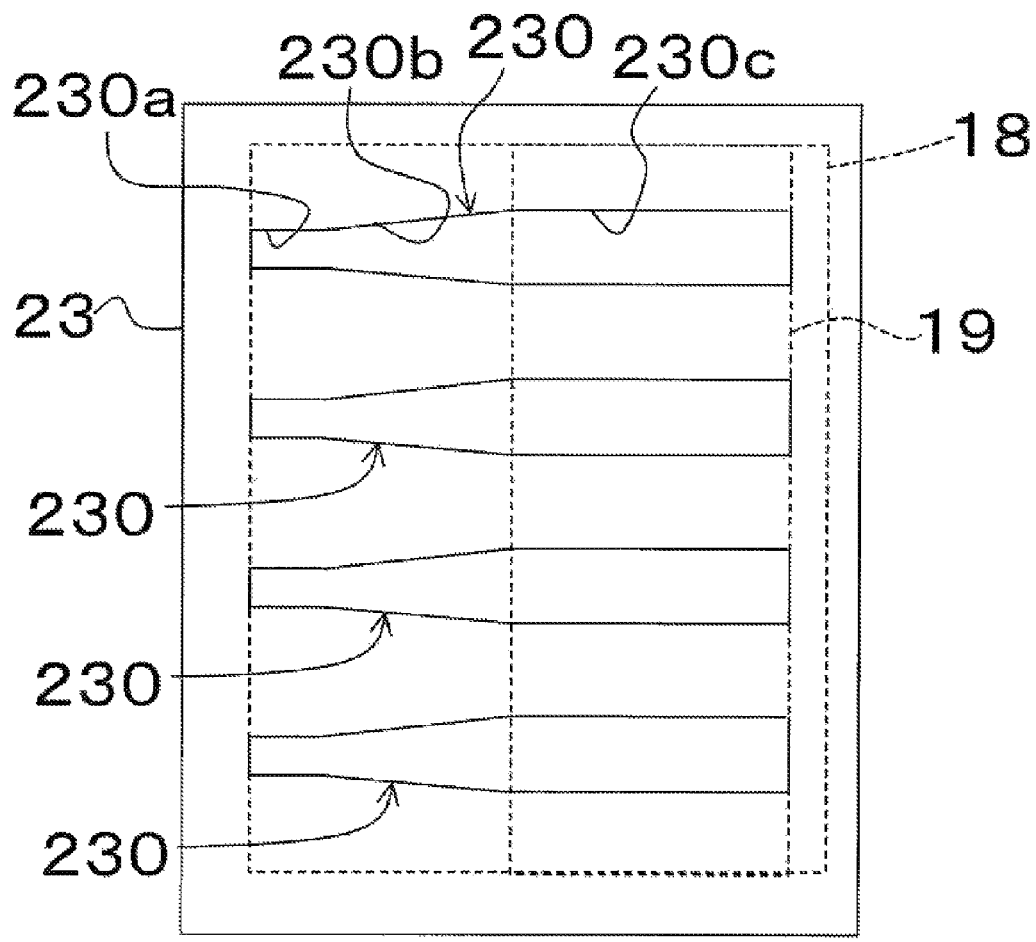
FIGS. 8A and 8B are explanatory diagrams showing one exemplary process of a method for manufacturing the SSC chip.
Figure 8B:
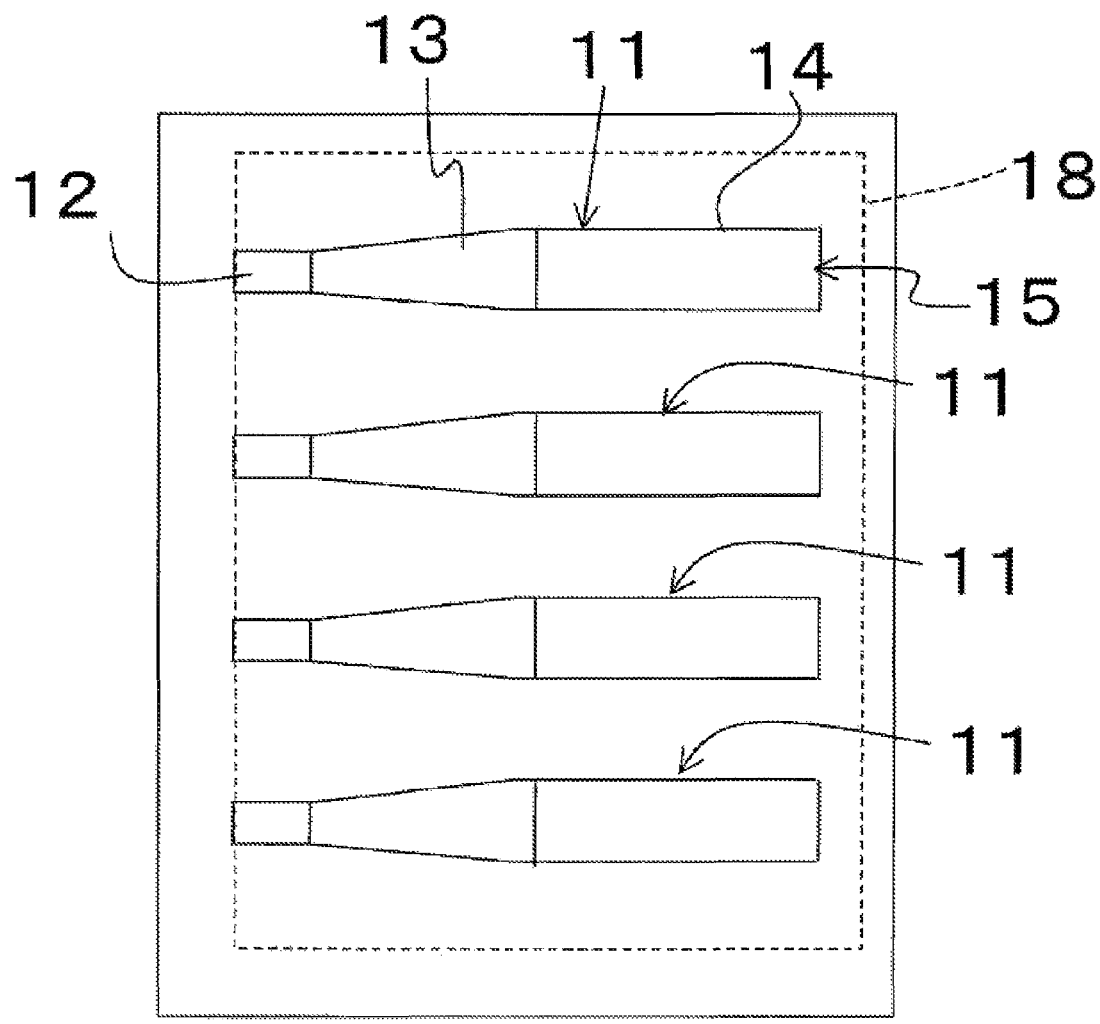

Next, using a photo-mask 23 having four patterns 230 as shown in FIG. 8A, four waveguide patterns, i.e., the horizontal shape of the four SSCs 11 shown in FIG. 8B is formed by means of photolithography and reactive ion etching. It is noted that a straight portion 230a of each pattern 230 is a part forming the horizontal shape of the straight waveguide 12 of the SSC 11, an inclined portion 230b is a part forming the horizontal shape of the horizontally tapered waveguide 13 and a straight portion 230c is a part forming the horizontal shape of the vertically tapered waveguide 14 of the SSC 11.

(Fifth Stage)

Figure 9A:
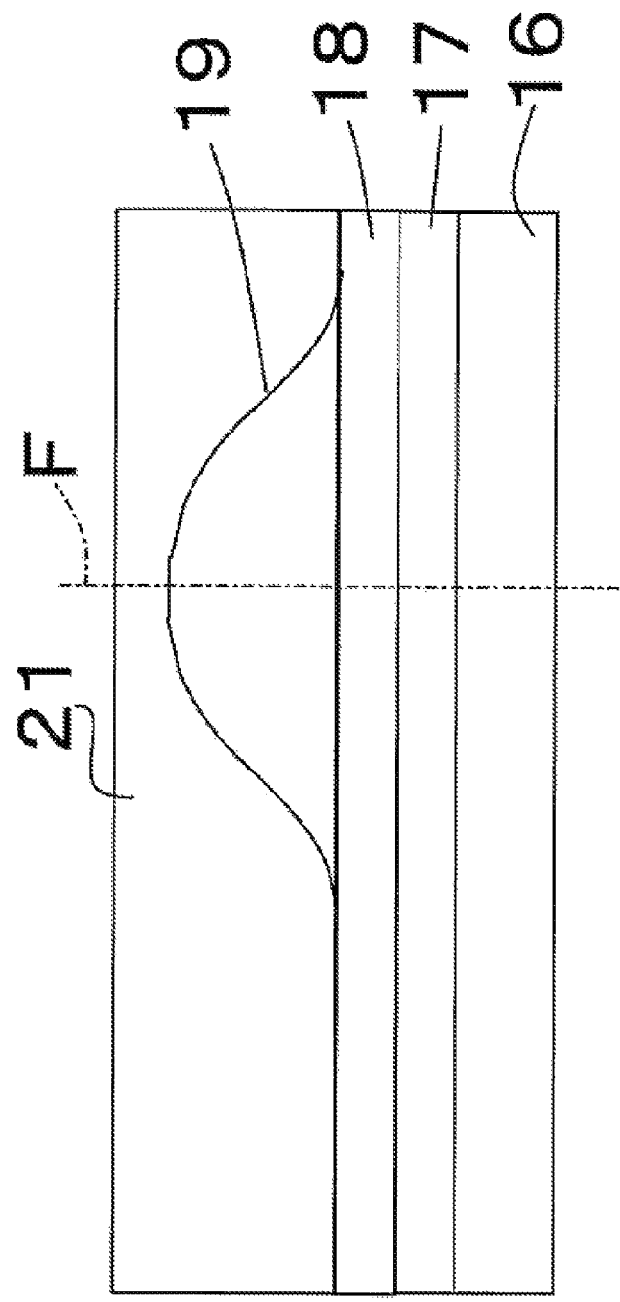
FIGS. 9A is an explanatory diagram showing one exemplary process of a method for manufacturing the SSC chip and FIG. 9B is a section view of the fabricated SSC chip.

Next, the upper cladding layer 21 is formed on the four SSCs (waveguide patterns) 11 again by means of the flame hydrolysis deposition (see FIG. 9A).

(Sixth Stage)

Figure 9B:
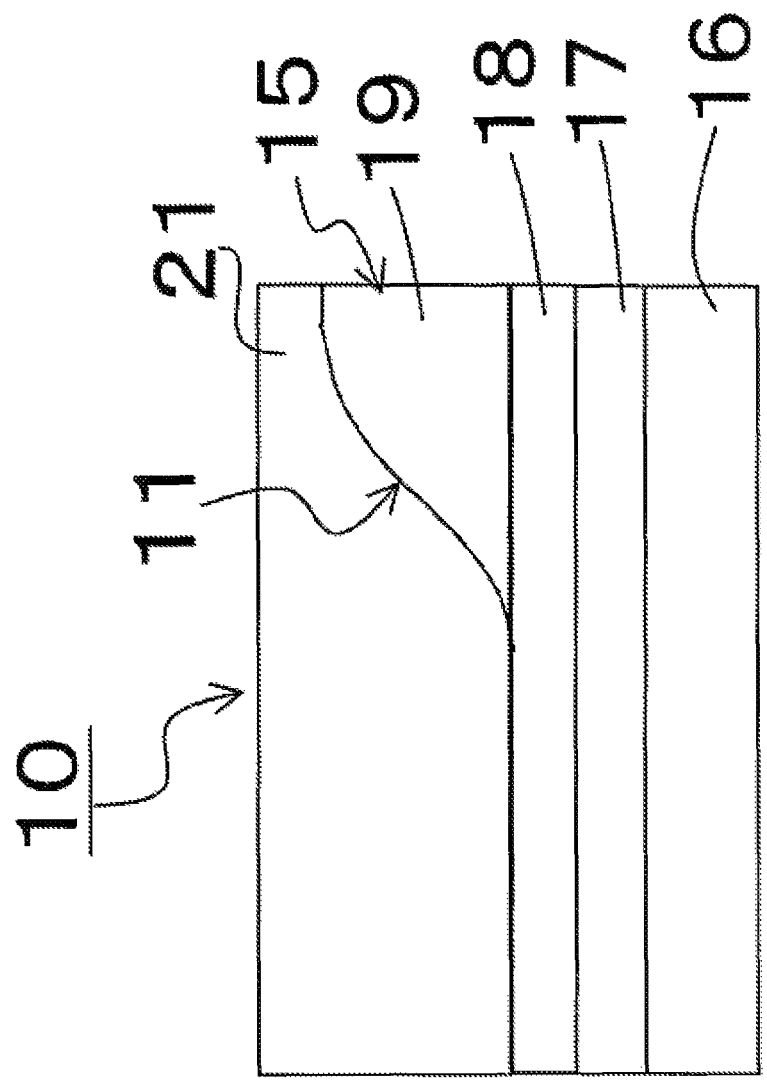

Next, the structure shown in FIG. 19A is cut so that the end of the straight waveguide 12 and the spot-size enlarged portion 15 shown in FIG. 2 are formed respectively at edges thereof. It is noted that the structure shown in FIG. 19A is cut at a cutting point F in the figure in order to form the spot-size enlarged portion 15 at the edge. Thereby, the SSC chip 10 having the four SSCs 11 as shown in FIG. 1 is completed (see FIG. 9B). FIG. 9B shows a cross section of the completed SSC chip 10.

[Embodiment]

Next, an embodiment of the SSC chip 10 shown in FIG. 1 will be explained. In this embodiment, the second core layer 19 of 2.5% Δ (relative index difference Δ with the upper cladding layer 21 is 2.5%) having the tapered structure in the vertical direction is formed on the first core layer 18 of 2.5% Δ (relative index difference Δ with the lower cladding layer 17 is 2.5%) in the third stage by combining the plasma CVD and the shadow mask.

Then, the four waveguide patterns are formed in the fourth stage by the photolithography and the reactive ion etching to form the SSC 11.

The core height T1 and core width W1 of the other end of the SSC 11 are t1=W1=3.5 μm that are the same with the real circuit of 2.5% Δ core, e.g., the input/output waveguide 32 of the real circuit 31 of the PLC chip 30 shown in FIG. 15) and one end of the SSC 11 is T2=W2=12.5 μm. The other end of the SSC 11 whose core height T1 and the core width W1 are 3.5 μm, i.e., the end of the straight waveguide 12, is a spot size connected with the input/output waveguide of the PLC chip of 2.5% Δ core with low loss. Further, one end of the SSC 11 whose core height T2 and core width W2 are 12.5 μm, i.e., the spot-size enlarged portion 15, is converted into a spot size connected with a SMF (single mode fiber) with low loss.

The cross sections of the SSC 11, i.e., all of the straight waveguide 12 having the same size with the input/output waveguide 32 of the real circuit 31, the horizontally tapered waveguide 13, the vertically tapered waveguide 14 and the spot-size enlarged portion 15 are maintained in the rectangular shape.

Figure 10:
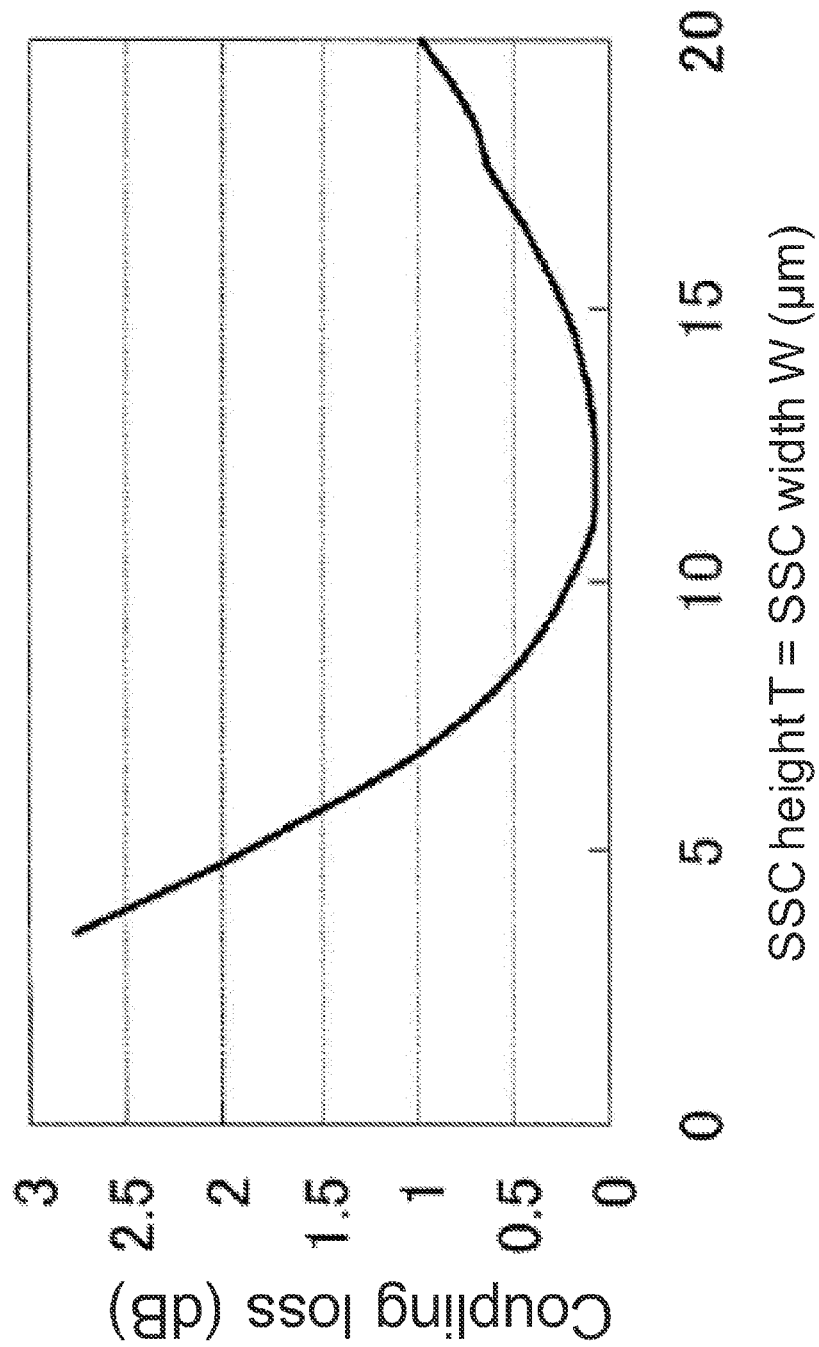
FIG. 10 is a graph showing a relationship between a size T=W (core height T=core width W) of the SSC chip fabricated by the first embodiment and a calculated value of coupling loss between SSC-SMF.

FIG. 10 shows a relationship between the size T=W (core height T=core width W) of the SSC 11 and a calculated value of coupling loss between SSC-SMF. While the coupling loss becomes about 2.6 dB if the SSC having the same height and width T1=W1=3.5 μm with the input/output waveguide of the real circuit of 2.5% Δ core is coupled with the SMF as it is, the coupling loss is reduced to about 0.07 dB when the SSC 11 having T2=W2=12.5 μm is connected with the SMF.

The SSC chip 10 of the first embodiment having the arrangement described above brings about the following effects.

(1) It becomes unnecessary to fabricate, i.e., to add, the SSC to the end of the light waveguide of the PLC chip, i.e., to the end of the input/output waveguide connected to the real circuit, to connect PLC chips having light waveguides whose spot sizes are different or to connect PLC chip with a fiber with low loss by fabricating the SSC chip 10 having the plurality of SSCs 1 independently from the PLC chip having the planar lightwave circuit. It improves the yield more than the conventional PLC chip having the planar lightwave circuit in which the SSC is added to the end of the input/output waveguide.

(2) It becomes unnecessary to create the vertical taper in which the core diameter is enlarged in the vertical direction in the PLC chip itself by fabricating the SSC chip 10 having the plurality of SSCs 11 independently from the PLC chip having the planar lightwave circuit and the process for enlarging the core diameter in the vertical direction becomes unnecessary in fabricating the PLC chip. Therefore, the PLC chip fabricating process may be simplified and the cost for manufacturing the PLC chip may be cut by the eliminated process.

(3) It becomes possible to create the vertically tapered waveguide in which the core diameter is enlarged in the vertical direction, i.e., the core height is enlarged in the tapered shape in the vertical direction, by carrying out the step of forming the second core layer 19 of the SSC chip 10 by combining the plasma CVD with the shadow mask. Due to that, it becomes possible to cut the processing step of enlarging the core diameter in the vertical direction in fabricating the PLC chip, thus simplifying the process. Accordingly, it is possible to improve the yield and to simplify the process as compared to the process for fabricating the conventional PLC chip having the light waveguide to which the spot-size converter (SSC) is added.

(4) The SSC chip 10 has the horizontally tapered waveguide 13 having a horizontally tapered portion 13a whose core width is enlarged in the tapered shape in the horizontal direction from the core width of the straight waveguide 12 and the vertically tapered waveguide 14 having the vertically tapered portion 14a whose core height is enlarged in the tapered shape in the vertical direction from the core height of the straight waveguide 13. Therefore, this SSC chip may be used for the PLC chip having no horizontally tapered waveguide whose core width is enlarged in the tapered shape in the horizontal direction at each end of the plurality of input/output waveguides 32 connected to the PLC chip 30 as shown in FIG. 15, i.e., the real circuit 31 to connect the light waveguides and fibers whose spot sizes (mode field diameter) are different with low loss.

(5) The mismatch of mode fields (difference of the mode fields) may be reduced, thus reducing the coupling loss, by interposing the SSC chip 10 between the PLC chip and the fiber array in coupling the PLC chip of the type A having the planar lightwave circuit of the high Δ (large specific index difference) waveguide with the fiber array in which the normal single mode fibers (SMF) are arrayed.

(6) The mismatch of mode fields may be reduced, thus reducing the coupling loss, by interposing the SSC chip 10 between the both PLC chips in also coupling the PLC chips of the type A whose Δ of the waveguide is different.

(7) In one exemplary method for manufacturing the SSC chip 10 described above, the first core layer 18 is formed by means of plasma CVD and the second core layer 19 having the vertically tapered structure is formed on the first core layer 18 by the plasma CVD in the same manner. Thereby, the first core layer 18 has the same optical characteristics with the second core layer 19, so that the SSC chip 10 excellent in the optical characteristics may be realized.

(Other Embodiments of the SSC Chip)

Figure 11:
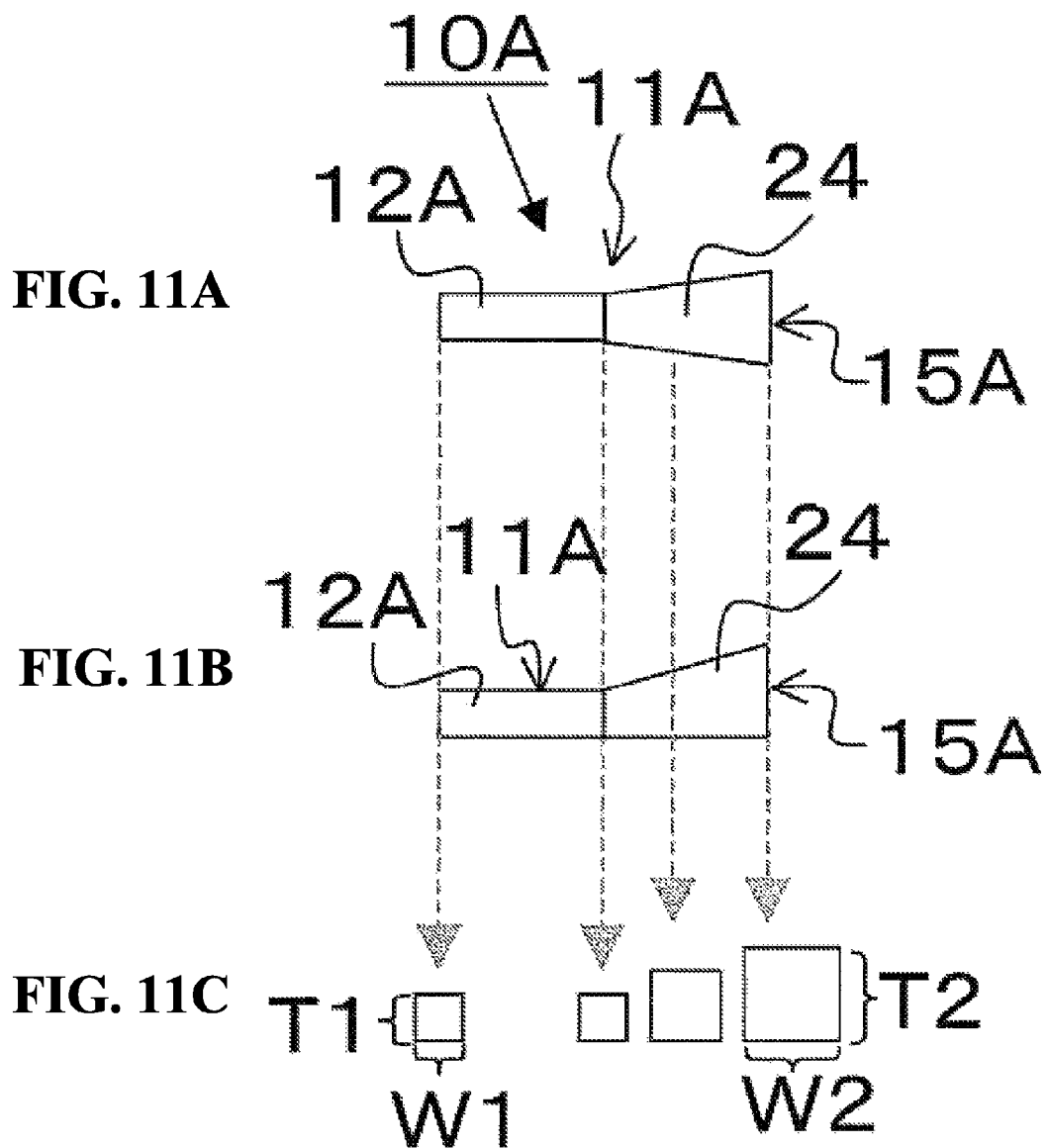

FIGS. 11A through 11C show only the SSC of a SSC chip 10A of a second embodiment of the invention. This SSC chip 10A is what only the configuration of the SSC 11 is changed in the SSC chip 10 of the first embodiment shown in FIGS. 1 through 5 and other structures are the same with those of the SSC chip 10.

Similarly to the SSC chip 10, the SSC chip 10A shown in FIGS. 11A through 11C is used for the PLC chip 30 of the type A as shown in FIG. 15. The SSC 11A of the SSC chip 10A has, in an order formed, a straight waveguide 12A having the same core width and core height with the end of the input/output waveguide 32 of the PLC chip 30, the vertically and horizontally tapered waveguide 24 whose core width and core height are both enlarged in the tapered shape respectively in the vertical and horizontal directions from the core width and core height of the straight waveguide 12A and a spot-size enlarged portion 15A whose core width and core height are both enlarged.

The SSC chip 10A of the second embodiment brings about the same effects with the first embodiment described above.

Figure 12:
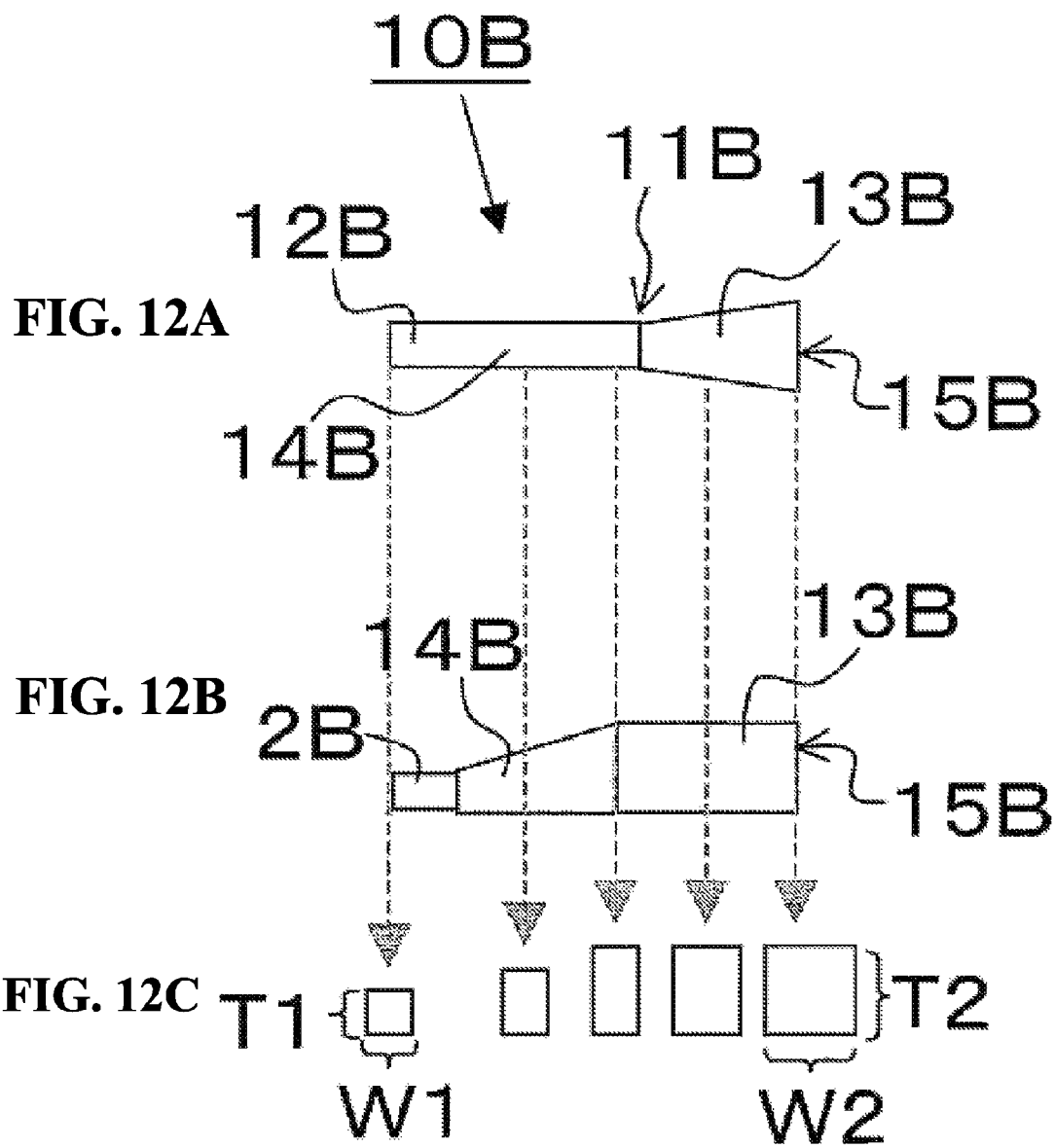

FIGS. 12A through 12C show only the SSC of a SSC chip 10B of a third embodiment of the invention. This SSC chip 10B is what only the configuration of the SSC 11 is changed in the SSC chip 10 of the first embodiment and the other structures are the same with those of the SSC chip 10.

Similarly to the SSC chip 10, the SSC chip 10B shown in FIGS. 12A through 12C is used for the PLC chip 30 of the type A as shown in FIG. 15. The SSC 11B of the SSC chip 10B has, in an order formed, a straight waveguide 12B having the same core width and core height with the end of the input/output waveguide 32 of the PLC chip 30, a vertically tapered waveguide 14B whose core height is enlarged in the tapered shape in the vertical direction from the core height of the straight waveguide 12B, a horizontally tapered waveguide 13B whose core width is enlarged in the tapered shape in the horizontal direction from the core width of the vertically tapered waveguide 14B and a spot-size enlarged portion 15B whose core width and core height are both enlarged.

The SSC chip 10B of the third embodiment brings about the same effects with the first embodiment described above.

FIGS. 13A through 13C show only the SSC of a SSC chip 10C of a fourth embodiment of the invention. This SSC chip 10C is what only the configuration of the SSC 11 is changed in the SSC chip 10 of the first embodiment and the other structures are the same with those of the SSC chip 10.

Figure 18:
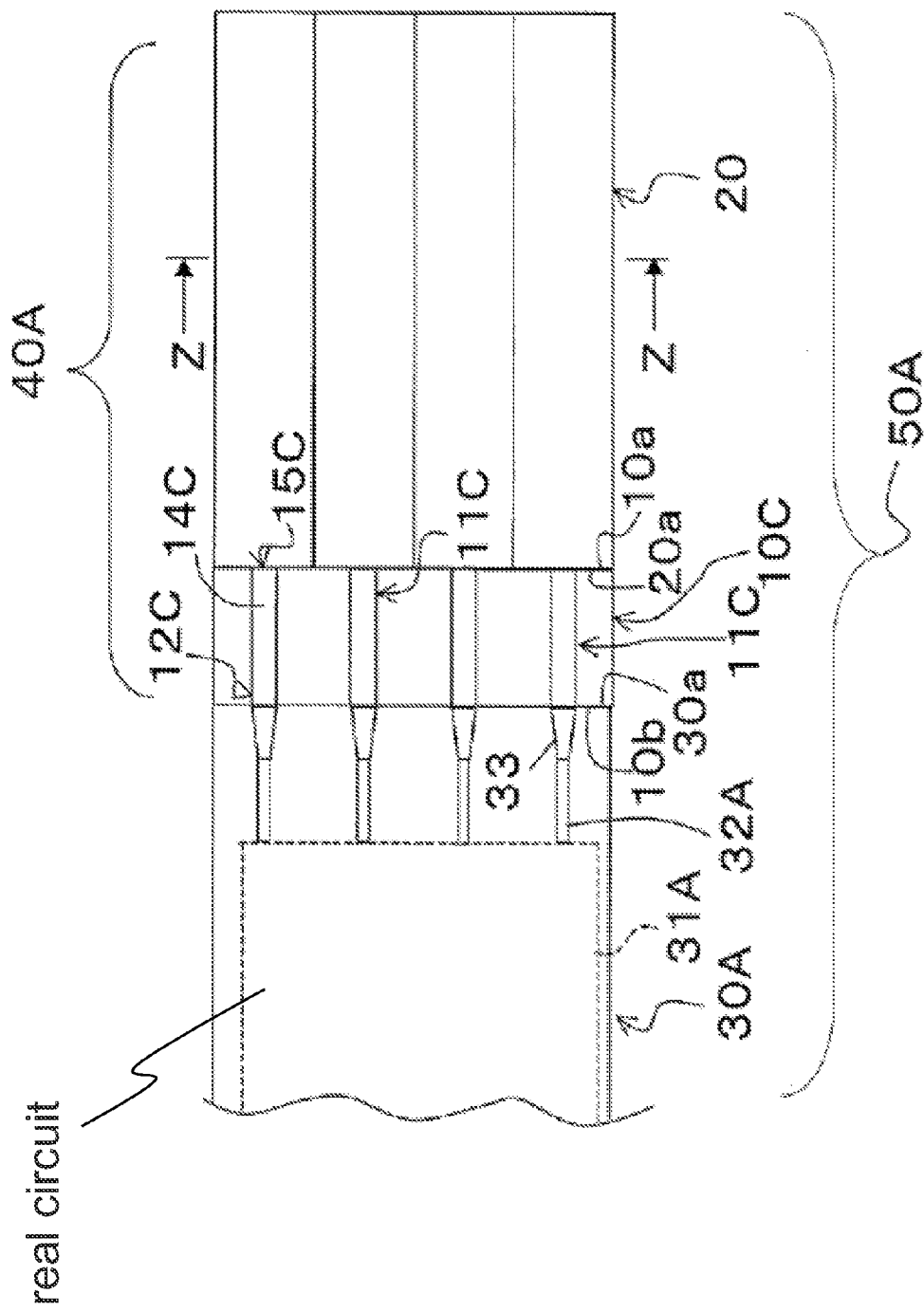
FIG. 18 is a plan view showing the fiber array attached with the SSC chip of the second embodiment.

The SSC chip 10C shown in FIGS. 13A through 13C is used for a PLC chip 30A as shown in FIG. 18. This PLC chip 30A is what a horizontally tapered waveguide 33 whose core width is enlarged in a tapered shape is formed at each end of a plurality of input/output waveguides 32A connected to a real circuit 31A (this type of PLC chip will be referred to as "a PLC chip of type B" hereinafter).

The SSC 11C of the SSC chip 10C has, in an order formed, a straight waveguide 12C having the same core width and core height with the end of the horizontally tapered waveguide 33 of the PLC chip 30A, a vertically tapered waveguide 14C whose core height is enlarged in the tapered shape in the vertical direction from the core height of the straight waveguide 12C and a spot-size enlarged portion 15C whose core width and core height are both enlarged.

The SSC chip 10C of the fourth embodiment brings about the same effects with the first embodiment described above.

(Fiber Array Attached with SSCs of the First Embodiment)

FIGS. 14 through 17 show a fiber array attached with the SSC 40 of the first embodiment of the invention.

The fiber array attached with the SSC 40 has the SSC chip 10 shown in FIG. 1 and a fiber array 20 in which a plurality of (four in this embodiment) fibers 25 is arrayed. Each fiber 25 is a single mode fiber for example. The fiber array 20 has a holding plate 26 having four V grooves 26a and the four fibers 25 arrayed on the four V grooves 26a.

In the fiber array attached with the SSC 40, an end face 10a of the SSC chip 10 is coupled with an end face 20a of the fiber array 20 so that each spot-size enlarged portion 15 of the four SSCs 11 is connected with each end face 25a of the four fibers 25 with minimum connecting loss.

In the fiber array attached with the SSC 40, the plurality of SSCs 11 of the SSC chip 10 fabricated by the photolithography described above is formed at the same intervals with the intervals of cores of the respective fibers 25 of the fiber array 20. Then, the fiber array attached with the SSC 40 is fabricated by connecting each SSC 11 of the SSC chip 10 with each fiber 25 of the fiber array 20 so that the connecting loss is minimized at all ports.

The fiber array attached with the SSC 40 having such arrangement may be used for the PLC chip 30 of the type A as shown in FIG. 15.

Still more, the waveguide of the PLC chip 30 and the fibers whose spot sizes are different may be connected through the SSC chip 10 with low loss by connecting the end of the straight waveguide 12 of each SSC 11 of the SSC chip 10 with the end of each input/output waveguide 32 of the PLC chip 30 so that the connecting loss is minimized at all of the ports.

Still more, one kind of fiber array attached with the SSC 40 may be used for many kinds of PLC chips 30 in which a number of the input/output waveguides 32 is different in common by fabricating the fiber array attached with the SSC 40 in which a number of the SSCs 11 of the SSC chip 10 and a number of the fibers 25 of the fiber array 20 are respectively increased (by eight for example) in advance.

(Fiber Array Attached with SSCs of the Second Embodiment)

Figure 19:
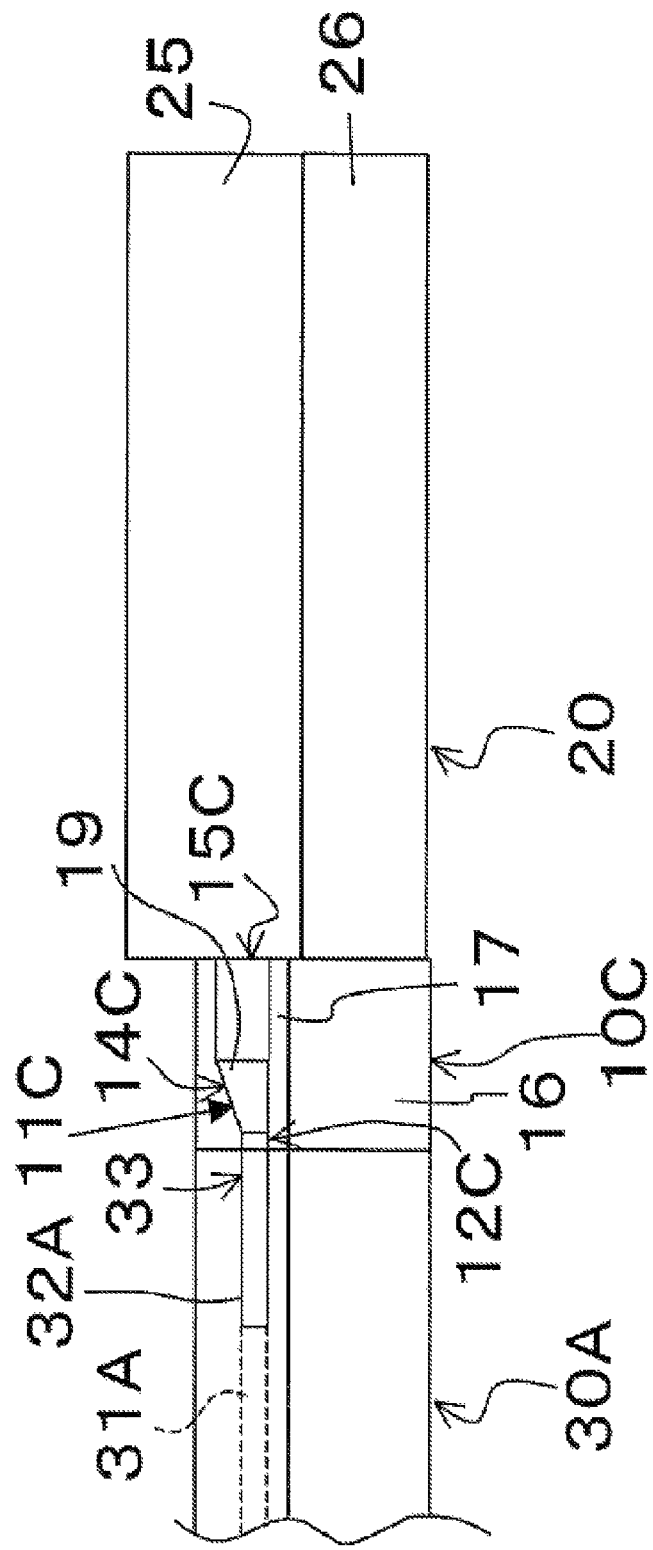
FIG. 19 is a longitudinal section view showing the fiber array attached with the SSC chip.

FIGS. 18 and 19 show a fiber array attached with the SSC 40A of the second embodiment of the invention.

Figure 13:
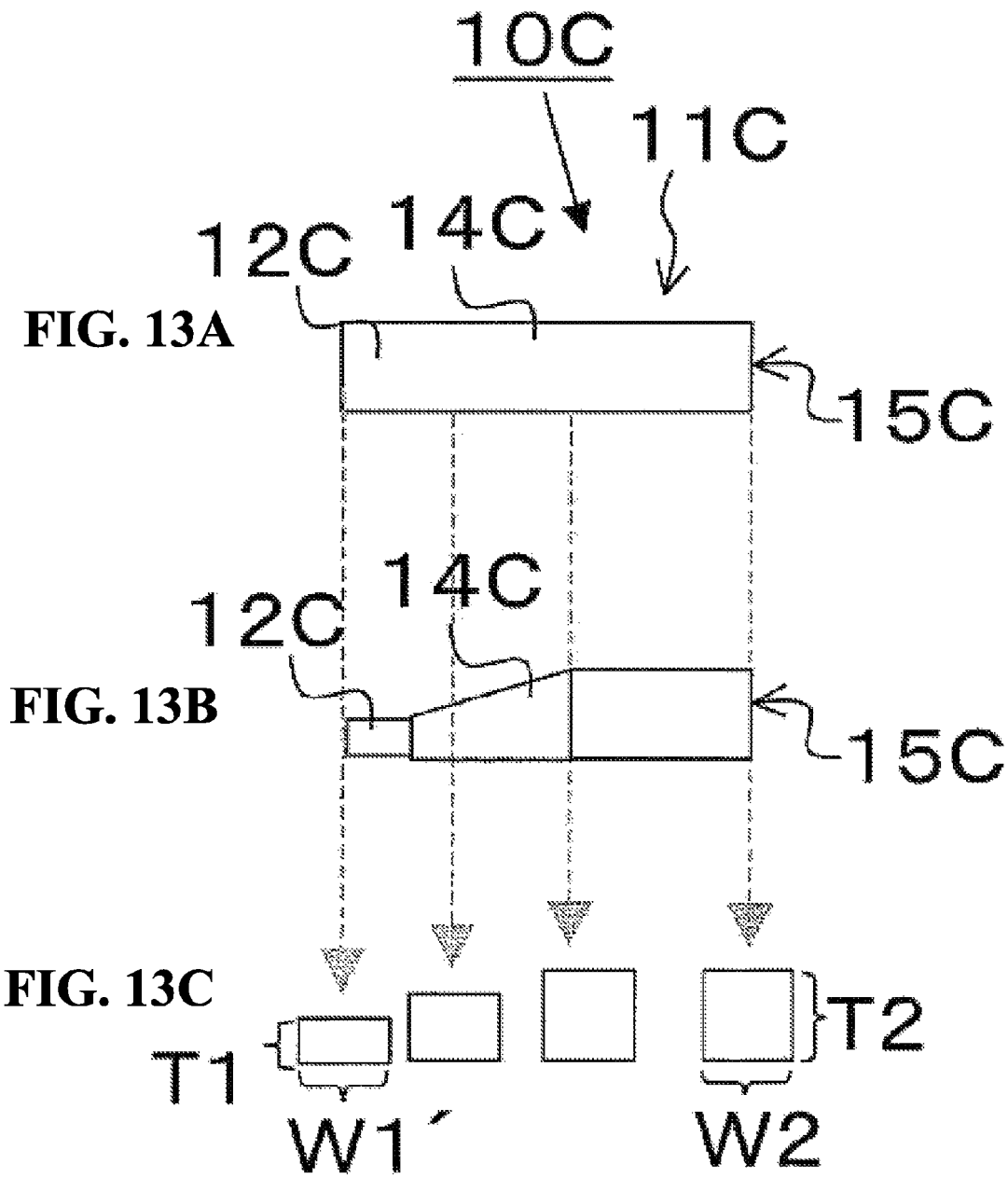

The fiber array attached with the SSC 40A has the SSC chip 10C having four SSCs 11C as shown in FIG. 13 and the fiber array 20 in which four fibers 25 are arrayed.

Figure 14:
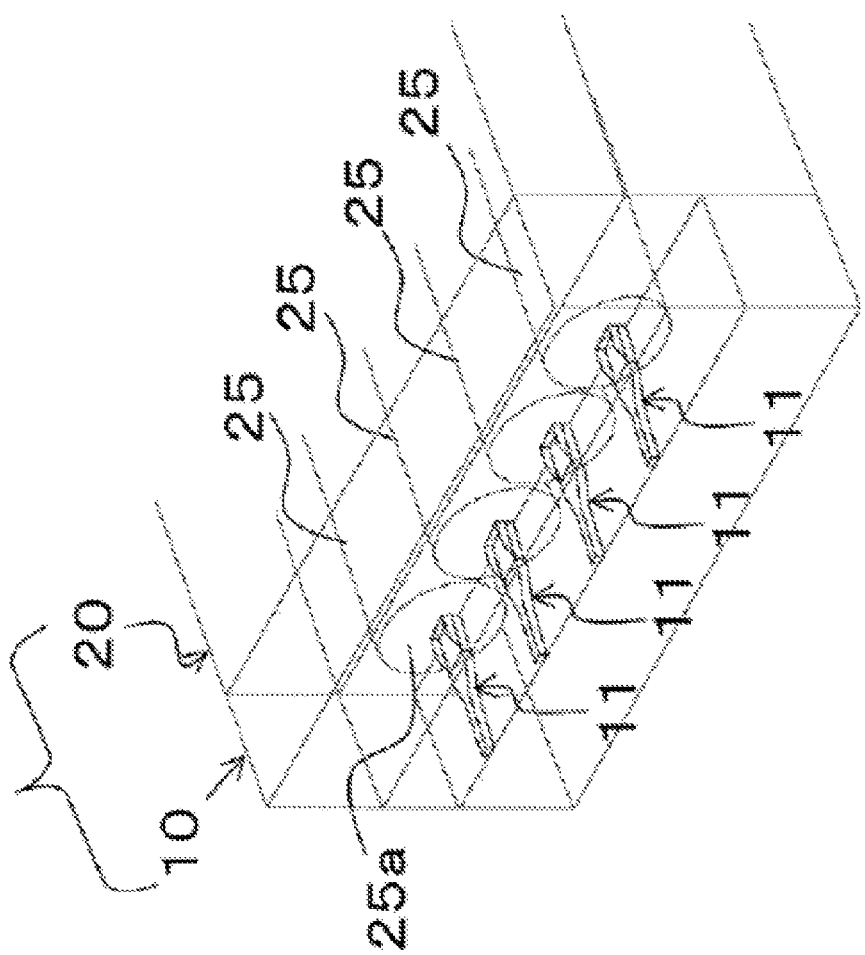
FIG. 14 is a perspective view showing a fiber array attached with the SSC chip of the first embodiment.

In the fiber array attached with the SSC 40A, an end face 10a of the SSC chip 10C is coupled with an end face 20a of the fiber array 20 so that each spot-size enlarged portion 15C of the four SSCs 11 is connected with each end face 25a of the four fibers 25 with minimum connecting loss (see FIG. 14).

In the fiber array attached with the SSC 40A, the SSCs 11 of the SSC chip 10 fabricated by the photolithography described above are formed at the same intervals with the intervals of the cores of the respective fibers 25 of the fiber array 20. Then, the fiber array attached with the SSC 40 is fabricated by connecting each SSC 11C of the SSC chip 10C with each fiber 25 of the fiber array 20 so that the connecting loss is minimized at all ports.

The fiber array attached with the SSC 40 having such arrangement may be used for the PLC chip 30 of the type B as shown in FIG. 18.

Still more, the waveguide of the PLC chip 30A and the fibers whose spot sizes are different may be connected through the SSC chip 10C with low loss by connecting the end of the straight waveguide 12C of each SSC 11C of the SSC chip 10C with the end of each input/output waveguide 32A of the PLC chip 30A so that the connecting loss is minimized at all of the ports.

Still more, one kind of fiber array attached with the SSC 40A may be used for many kinds of PLC chips 30A in which a number of the input/output waveguides 32 is different in common by fabricating the fiber array attached with the SSC 40A in which a number of the SSCs 11C of the SSC chip 10C and a number of the fibers 25 of the fiber array 20 are respectively increased (by eight for example) in advance.

(PLC Module Attached with the SSC of the First Embodiment)

Figure 16:
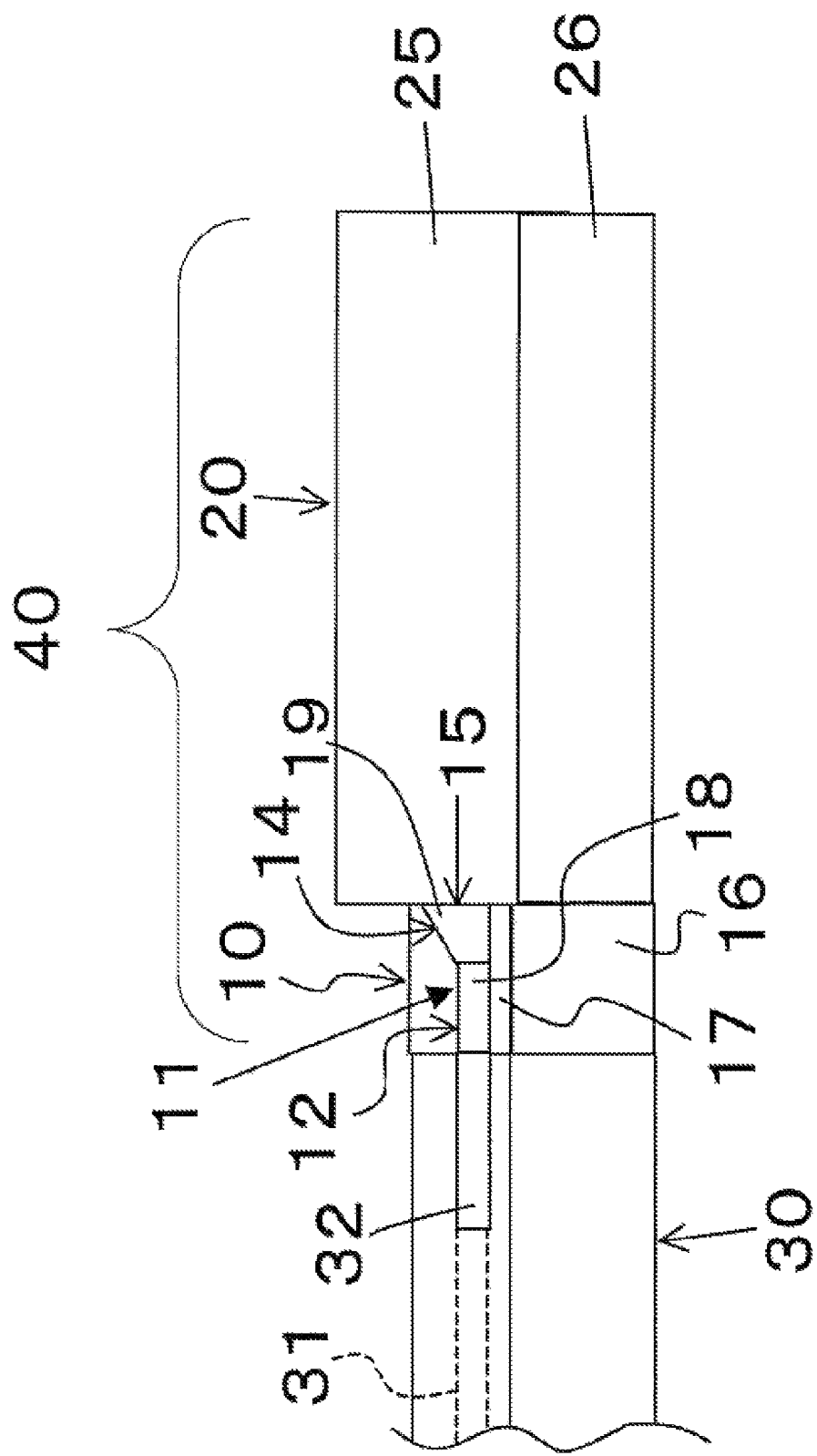
FIG. 16 is a longitudinal section view showing the fiber array attached with the SSC chip.
Figure 17:
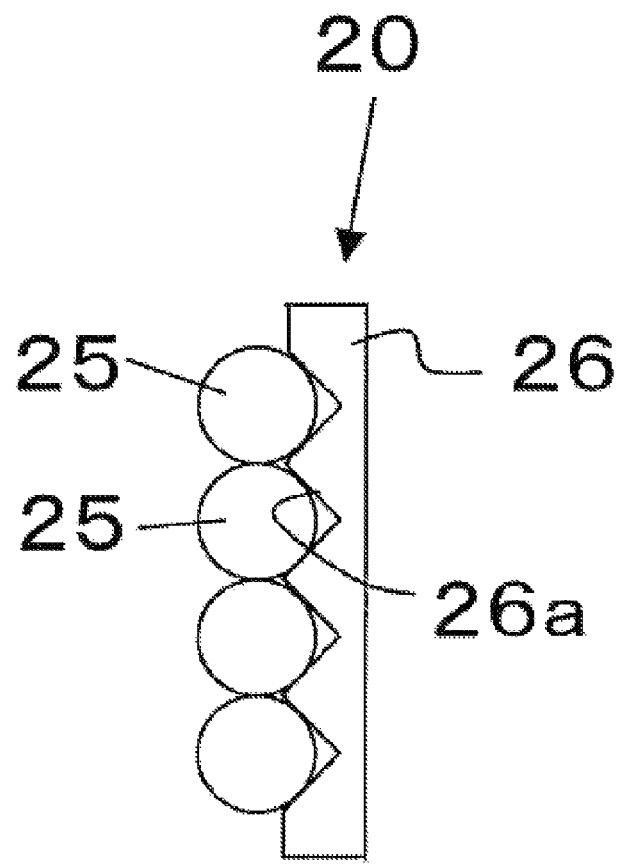
FIG. 17 is a section view along a line Y-Y in FIG. 15.

A PLC module attached with the SSC 50 of the first embodiment will be explained with reference to FIGS. 15 through 17.

The PLC module attached with the SSC 50 is what the fiber array attached with the SSC 40 of the first embodiment explained with reference to FIGS. 14 through 17 is combined with the PLC chip 30 of the type A shown in FIG. 15. That is, the PLC module attached with the SSC 50 has the SSC chip 10 of the first embodiment shown in FIG. 1, the PLC chip 30 and the fiber array 20 in which the plurality of fibers is arrayed.

In the PLC module attached with the SSC 50, an end face (one end face) 10b of the SSC chip 10 is coupled with an end face 30a of the PLC chip 30 so that the end of each straight waveguide 12 of the four (plurality of) SSCs 11 is connected with the end of the four (plurality of) input/output waveguides 32 respectively with minimum connecting loss.

Still more, in the PLC module attached with the SSC 50, an end face (other end face) 10a of the SSC chip 10 is coupled with an end face 20a of the fiber array 20 so that each spot-size enlarged portion 15 of the four SSCs 11 is connected with the end face 25a of the four fibers 25 with minimum connecting loss.

According to the PLC module attached with the SSC 50 of the first embodiment, the light waveguide of the PLC chip 30 may be connected with each fiber 25 of the fiber array 20 having different spot sizes through the SSC chip 10 with low loss. It is also possible to improve the yield more than the conventional PLC chip having the planar lightwave circuit in which the SSC is added to the end of the input/output waveguide by fabricating the SSC chip 10 having the plurality of SSCs 11 independently from the PLC chip 30 having such planar lightwave circuit.

(PLC Module Attached with the SSC of the Second Embodiment)

A PLC module attached with the SSC 50A of the second embodiment will be explained with reference to FIGS. 18 and 19.

The PLC module attached with the SSC 50A is what the fiber array attached with the SSC 40A of the second embodiment explained with reference to FIGS. 18 and 19 is combined with the PLC chip 30A of the type B shown in FIG. 18. That is, the PLC module attached with the SSC 50A has the SSC chip 10C of the third embodiment shown in FIG. 13, the PLC chip 30A and the fiber array 20 in which four fibers are arrayed.

In the PLC module attached with the SSC 50, an end face (one end face) 10b of the SSC chip 10C is coupled with an end face 30a of the PLC chip 30A so that the end of each straight waveguide 12 of the four SSCs 11 is connected with each horizontally tapered waveguide 33 at the end of the four input/output waveguides 32 respectively with minimum connecting loss.

Still more, in the PLC module attached with the SSC 50A, an end face (other end face) 10a of the SSC chip 10C is coupled with an end face 20a of the fiber array 20 so that each spot-size enlarged portion 15 of the four SSCs 11 is connected with the end face 25a of the four fibers 25 with minimum connecting loss.

According to the PLC module attached with the SSC 50A of the second embodiment, the light waveguide of the PLC chip 30A may be connected with each fiber 25 of the fiber array 20 having different spot sizes through the SSC chip 10C with low loss. It is also possible to improve the yield more than the conventional PLC chip having the planar lightwave circuit in which the SSC is added to the end of the input/output waveguide by fabricating the SSC chip 10C having the plurality of SSCs 11C independently from the PLC chip 30A having such planar lightwave circuit.

(Different Exemplary Method for Manufacturing the SSC Chip)

Figure 20A:
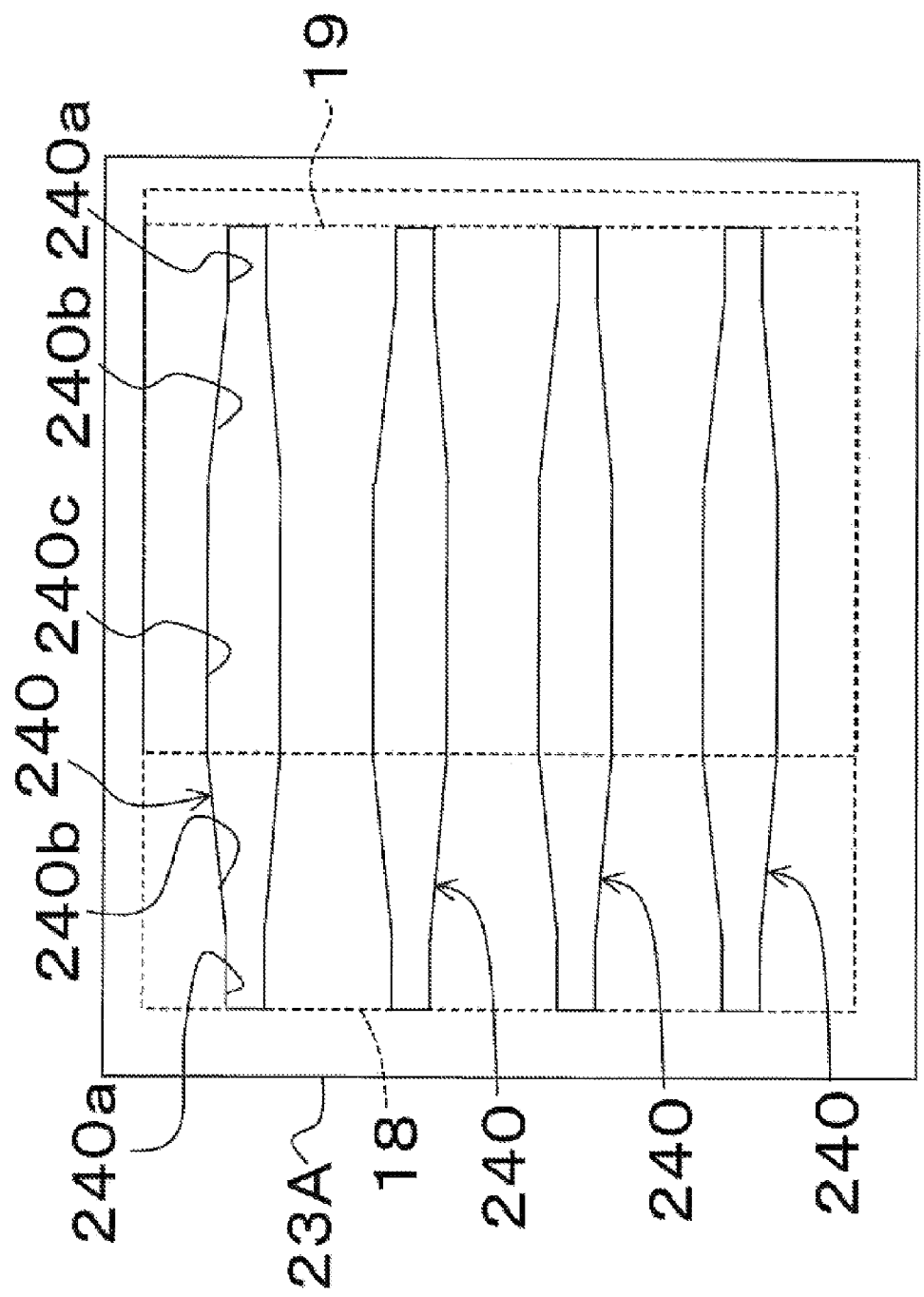
FIGS. 20A and 20B show a different exemplary process of the method for manufacturing the SSC chip.

In this different example, a photo-mask 23A shown in FIG. 20 will be used instead of the photo-mask 23 shown in FIG. 8A in the fourth stage explained in one exemplary method for manufacturing the SSC chip 10 described above.

The photo-mask 23A has four patterns 240 and each pattern 240 forms the horizontal shape of the two SSCs 11. That is, each pattern 240 has right and left straight portions 240a respectively forming the horizontal shape of the straight waveguide 12 of the SSC 11, inclined portions 240b respectively forming the horizontal shape of the horizontally tapered waveguide 13 of the SSC 11 and a wide-width straight portion 240c forming the horizontal shape of the vertically tapered waveguide 14 of the SSC 11. A longitudinal length of the straight portion 240c (length in the horizontal direction in FIG. 20) is twice of a longitudinal direction of the vertically tapered waveguide 14. Then, each pattern 240 is bilaterally symmetrical about the longitudinal center of the straight portion 240c.

Figure 20B:
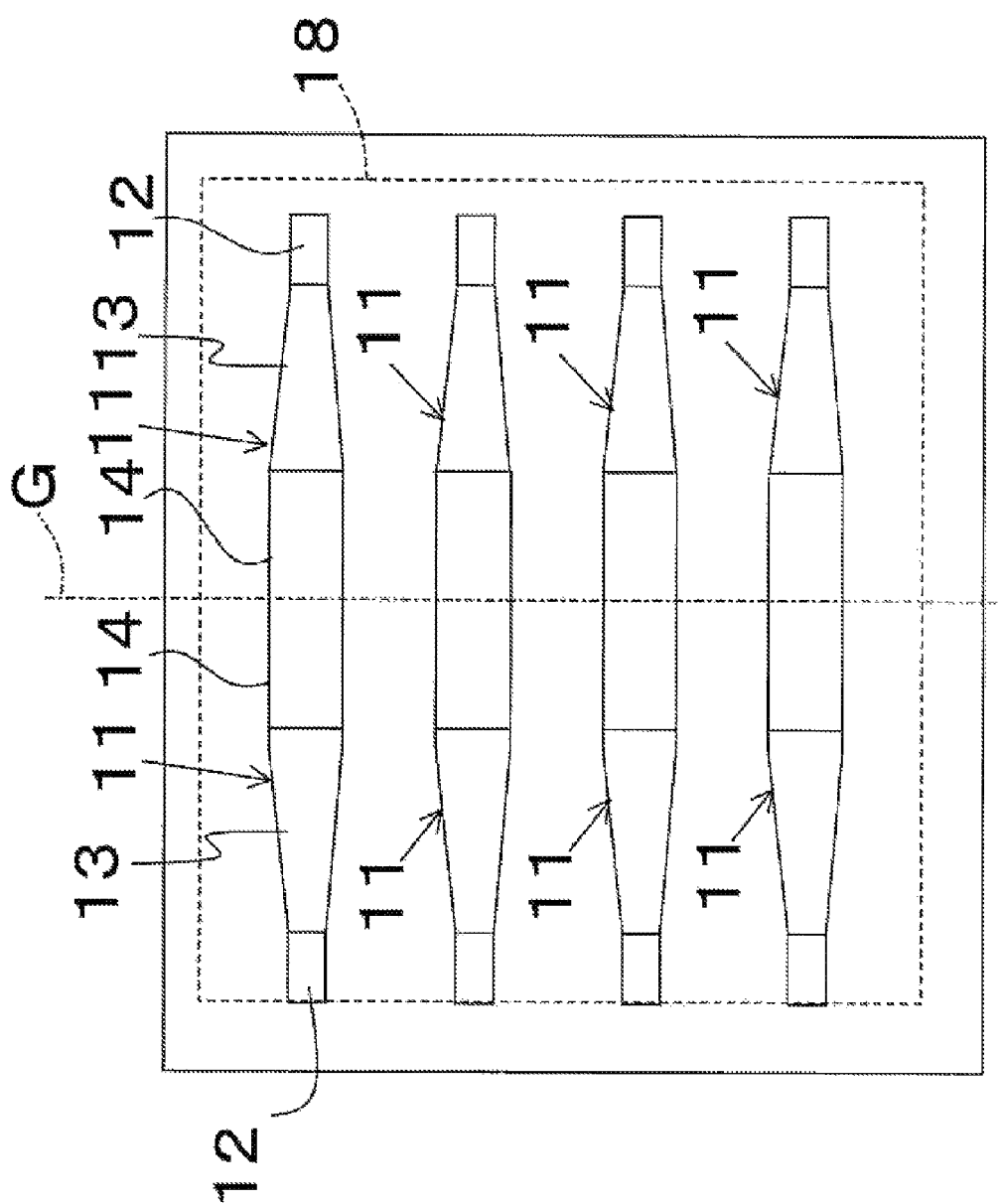

In the manufacturing method of this example using such photo-mask 23A, a structure shown in FIG. 20B is cut so that the end face of the straight waveguide 12 and the spot-size enlarged portion 15 are formed respectively at the ends as shown in FIG. 2 in the sixth stage explained in one exemplary manufacturing method of the SSC chip 10 described above. In this structure, two SSCs 11 are formed at each of the four patterns 240. Therefore, two SSC chips 10 respectively having the four SSCs 11 and having the cross section shown in FIG. 9B are completed by cutting the structure shown in FIG. 20B at a cutting spot G in the figure. Accordingly, the manufacturing method of this example allows a large number of SSC chips 10 to be formed on one chip and a cost thereof to be cut by reducing waste of materials.

It is noted that although the first core layer 18 is formed on the lower cladding layer 17 by means of the plasma CVD in one exemplary method for manufacturing the SSC chip 10 described above, the first core layer 18 may be formed on the lower cladding layer 17 by means of the flame hydrolysis deposition.

It is also noted that the number of SSCs is not limited to "four" in the SSC chip explained in each embodiment described above and the present invention is applicable to a SSC chip having one or a plurality of SSCs. Still more, the numbers of SSCs and fibers are not limited to "four" in the fiber array attached with the SSC chip and PLC module attached with the SSC chip explained in each embodiment described above.

What is claimed is:

1. A spot-size converter (SSC) chip having one or a plurality of spot-size converters, each said spot-size converter being a light waveguide composed of a clad and a core, comprising, in an order formed:

a straight waveguide whose core width and core height are constant;

a horizontally tapered waveguide whose core width is enlarged in a tapered shape in the horizontal direction from the core width of the straight waveguide;

a vertically tapered waveguide whose core height is enlarged in a tapered shape in the vertical direction from the core height of the straight waveguide; and a spot-size enlarged portion whose core height and core width are both enlarged, wherein said clad and core are made of a silica material, and said core has a uniform refraction index and square or rectangular cross sections of respective parts of said core.

2. A spot-size converter (SSC) chip having one or a plurality of spot-size converters, each said spot-size converter being a light waveguide composed of a clad and a core, comprising, in an order formed:

a straight waveguide whose core width and core height are constant;

a vertically tapered waveguide whose core height is enlarged in a tapered shape in the vertical direction from the core height of the straight waveguide;

a horizontally tapered waveguide whose core width is enlarged in a tapered shape in the horizontal direction from the core width of the straight waveguide; and a spot-size enlarged portion whose core height and core width are both enlarged, wherein said clad and core are made of a silica material, and said core has a uniform refraction index and square or rectangular cross sections of respective parts of said core.

3. An apparatus comprising:

the SSC chip of claim 1; and a fiber array in which a plurality of fibers are arrayed and disposed, wherein an end face of said SSC chip is coupled with an end face of the fiber array so that each spot-size enlarged portion of said plurality of spot-size converters is coupled with each end face of said plurality of fibers respectively with minimum coupling loss.

4. An apparatus, comprising:
the SSC chip of claim 1,
a PLC chip having a planar lightwave circuit connected to a plurality of input/output waveguides, and
a fiber array in which a plurality of fibers are arrayed and disposed, wherein
an end face of said SSC chip is coupled with an end face of the PLC chip so that each end face of said straight waveguides of said plurality of spot-size converters is coupled with each end face of said plurality of input/output waveguides of said planar lightwave circuit respectively with minimum coupling loss; and
an other end face of said SSC chip is coupled with an end face of the fiber array so that each spot-size enlarged portion of said plurality of spot-size converters is coupled with each end face of said plurality of fibers respectively with minimum coupling loss.

5. A method for manufacturing the SSC chip of claim 1, comprising steps of:
forming an under cladding layer on a substrate by means of flame hydrolysis deposition;
forming a first core layer on said substrate;
disposing a shadow mask having a plurality of openings at a predetermined position on said first core layer to form a second core layer having a vertically tapered structure in which core height is enlarged in a tapered shape at the predetermined position on said first core layer by means of plasma chemical vapor deposition (CVD);
forming a plurality of waveguide patterns by means of photolithography and etching with a photo mask which includes a first straight portion for a horizontal shape of the straight waveguide, an inclined portion for a horizontal shape of the horizontally tapered waveguide and a second straight portion for a horizontal shape of the vertically tapered waveguide; and
forming an upper cladding layer on said plurality of waveguide patterns by means of flame hydrolysis deposition.

6. The method for manufacturing the SSC chip according to claim 5, wherein the first core layer is formed by the means of plasma CVD.

7. The method for manufacturing the SSC chip according to claim 5, wherein the first core layer is formed by the means of flame hydrolysis deposition.

8. An apparatus comprising:
the SSC chip of claim 1, and
a PLC chip having a planar lightwave circuit whose core width and core height are constant.

9. An apparatus comprising:
the SSC chip of claim 1, and
a PLC chip having a planar lightwave circuit whose core width and core height are constant, wherein
a horizontally tapered waveguide whose core width is enlarged in a tapered shape in the horizontal direction is formed at an end of the core of the planar lightwave circuit.

10. An apparatus comprising:
the SSC chip of claim 2 and
a fiber array in which a plurality of fibers are arrayed and disposed, wherein
an end face of said SSC chip is coupled with an end face of the fiber array so that each spot-size enlarged portion of said plurality of spot-size converters is coupled with each end face of said plurality of fibers respectively with minimum coupling loss.

11. An apparatus comprising:
the SSC chip of claim 2,
a PLC chip having a planar lightwave circuit connected to a plurality of input/output waveguides, and
a fiber array in which a plurality of fibers are arrayed and disposed, wherein an end face of said SSC chip is coupled with an end face of the PLC chip so that each end face of said straight waveguides of said plurality of spot-size converters is coupled with each end face of said plurality of input/output waveguides of said planar lightwave circuit respectively with minimum coupling loss; and
an other end face of said SSC chip is coupled with an end face of the fiber array so that each spot-size enlarged portion of said plurality of spot-size converters is coupled with each end face of said plurality of fibers respectively with minimum coupling loss.

12. A method for manufacturing the SSC chip of claim 2, comprising steps of:
forming an under cladding layer on a substrate by means of flame hydrolysis deposition;
forming a first core layer on said substrate;
disposing a shadow mask having a plurality of openings at a predetermined position on said first core layer to form a second core layer having a vertically tapered structure in which core height is enlarged in a tapered shape at the predetermined position on said first core layer by means of plasma chemical vapor deposition (CVD);
forming a plurality of waveguide patterns by means of photolithography and etching with a photo mask which includes a first straight portion for a horizontal shape of the straight waveguide, a second straight portion for a horizontal shape of the vertically tapered waveguide and an inclined portion for a horizontal shape of the horizontally tapered waveguide; and
forming an upper cladding layer on said plurality of waveguide patterns by means of flame hydrolysis deposition.

13. The method for manufacturing the SSC chip according to claim 12, wherein the first core layer is formed by means of plasma CVD.

14. The method for manufacturing the SSC chip according to claim 12, wherein the first core layer is formed by means of flame hydrolysis deposition.

15. An apparatus comprising:
the SSC chip of claim 2, and
a PLC chip having a planar lightwave circuit whose core width and core height are constant.

16. An apparatus comprising:
the SSC chip of claim 2, and
a PLC chip having a planar lightwave circuit whose core width and core height are constant, wherein
a horizontally tapered waveguide whose core width is enlarged in a tapered shape in the horizontal direction is formed at an end of the core of the planar lightwave circuit.

* * * * *